(12) United States Patent
Hangmann

(10) Patent No.: US 6,290,846 B1
(45) Date of Patent: Sep. 18, 2001

(54) DEVICE FOR FILTERING MOLTEN PLASTIC

(75) Inventor: Manfred Hangmann, Greven (DE)

(73) Assignee: Wil-Man Polymer-Filtration GmbH, Wettringen (DE)

( * ) Notice: Subject to any disclaimer, the term of this patent is extended or adjusted under 35 U.S.C. 154(b) by 0 days.

(21) Appl. No.: 09/199,583

(22) Filed: Nov. 25, 1998

(30) Foreign Application Priority Data

Nov. 27, 1997 (DE) .............................. 197 52 590

(51) Int. Cl.$^7$ ................................... B01D 35/12

(52) U.S. Cl. ................. 210/236; 210/341; 210/435; 425/197

(58) Field of Search .................. 210/236, 340, 210/341, 435; 425/197, 198, 199

(56) References Cited

U.S. PATENT DOCUMENTS 3,797,665 * 3/1974 Paquette .............................. 210/236

* cited by examiner

Primary Examiner—Matthew O. Savage
(74) Attorney, Agent, or Firm—Proskauer Rose, LLP

(57) ABSTRACT

A device for the filtering of a fluid stream, particularly for the filtering or a molten plastic, with at least one fluid supply duct or a first connection area for connecting with an existing fluid supply duct and at least one fluid removal duct or a second connection area for connecting with an existing fluid removal duct, is described, whereby the fluid supply duct, respectively the first connection area, is connected with the fluid removal duct, respectively with the second connection area, by means of at least one partial fluid duct, and the partial fluid duct contains at least one filter being essentially arranged vertically to the flow direction of the fluid to be filtered, whereby the filter is fixed by means of an axially shiftable bolt being arranged vertically to the partial fluid duct. The device (1) has a modular construction in which relatively to the flow direction (19) of the fluid to be filtered a distribution module (2), at least one filter module (3, 3 A to F, 3' to 3"") comprising the partial fluid duct (6, 6a, 6b), and a final module (4) are detachably connected with each other. The distribution module (2) comprises at least one distribution duct (5, 5a to 5f) which connects the fluid supply duct, respectively the first connection area (18), with the partial fluid duct (6, 6a, 6b). The final module (4) comprises at least one outlet duct (7, 7a to 7f), whereby the outlet duct (7, 7a to 7f) extends between the partial fluid duct (6, 6a, 6b) and the fluid removal duct, respectively the second connection area (21).

11 Claims, 16 Drawing Sheets

DEVICE FOR FILTERING MOLTEN PLASTIC

BACKGROUND OF THE INVENTION

The present invention is directed to a device for the filtering of a fluid stream with the characteristics of the generic part of patent claim 1 as well as a filter module for the use in such a device.

In order to clean fluid streams, particularly molten plastics, before their processing, it is known to remove the foreign particles from the fluid streams, particularly from the molten plastics, by means of a corresponding filter.

In order realize this filtering of the fluid stream in a continuous manner, it is known for a long time to provide in this case a filtering device which is perfused by the corresponding fluid stream and particularly by the molten plastic. Hereby this filtering device, as far as it is used for the filtering of molten plastics, is arranged downstream of an extruder and upstream of a corresponding tool or a corresponding nozzle.

The DE-AS 15 54 913, for example, describes a corresponding filtering device for an extruder and for injection molding machines, whereby the known device comprises a housing which is provided with a partial fluid duct being perfused by the molten plastic to be correspondingly filtered. In the known device a bolt extends vertically to the flow direction of the fluid in the partial fluid duct, whereby this bolt supports corresponding filters in such a way that the filters are arranged vertically to the flow direction of the molten plastic in the partial fluid duct. By axially shifting of the bolt relatively to the flow direction of the molten plastic it is possible to arrange the filter containing foreign particles and being thus soiled at the outside of the housing, so that correspondingly to that this filter can be cleaned and exchanged. In order not to interrupt the filtering of the molten plastic in this state, the corresponding bolt is provided with a number of further filters which are fixed in the bolt with an axial distance to each other. During the afore mentioned cleaning operation another corresponding filter being supported by means of the same bolt comes into contact with the molten plastic, so that then this molten plastic is filtered by means of this other filter.

A device for the filtering of a fluid stream, particularly for the filtering of a molten plastic, with the characteristics of the generic part of patent claim 1 is known from the DE 195 19 519. Hereby the known device comprises a fluid supply duct and a fluid removal duct, whereby at least one partial fluid duct, namely two partial fluid ducts in the shown embodiment according to the DE 195 19 519, are located between the fluid supply duct and the fluid removal duct. Each partial fluid duct comprises a filter which is arranged mainly vertically to the flow direction of the fluid to be filtered, whereby this filter is supported by means of an axially shiftable bolt being located vertically to the partial fluid duct. As already described above in connection with the DE-AS 15 54 913, this bolt is fixed in a fluid-tight way by a corresponding housing, so that by axially shifting of the bolt the filter being supported by the bolt can be brought into contact with the fluid flowing within the partial fluid duct in order to thus filter the fluid. After the depositing of filtered particles on the filter the correspondingly soiled filter is removed from the fluid by axially shifting the bolt, so that the filter surface can correspondingly be cleaned.

Particularly in the field of plastic processing in which the afore described devices for the filtering of a fluid stream are preferably used, the filter size and the dimensions of the known filtering devices are generally adapted to the momentary needs, whereby the chosen filter size correlates with the plastic to be correspondingly processed and with the soiling of the plastic. Since, however, such filtering devices generally have a relatively long durability, the problem often occurs that the once chosen filter size of the filtering devices turns out to be either too large or too small in the run of the operating time, so that for that reason an optimum production can not be guaranteed anymore.

The present invention has the object of disposing a device of the filtering of a fluid stream, particularly for the filtering of a plastic, of the indicated sort, whereby this filtering device allows a particularly flexible adaptation to the different production conditions.

SUMMARY OF THE INVENTION

This object is realized according to the invention by a device for the filtering of a fluid stream, particularly for the filtration of a molten plastic, with the significant characteristics of patent claim 1 as well as by a filter module with the significant characteristics of patent claim 28.

The inventive device for the filtering of a fluid stream, particularly for the filtration of a molten plastic, comprises at least one fluid supply duct or a first connection area for connecting with an existing fluid supply duct and at least one fluid removal duct or a second connection area for connecting with an existing fluid removal duct. The fluid supply duct, respectively the corresponding first connection area, is connected with the fluid removal duct, respectively with the second connection area, by means of at least one partial fluid duct, whereby the at least one partial fluid duct comprises at least one filter being essentially arranged vertically to the flow direction of the fluid to be filtered. This at least one filter is fixed by means of a bolt being arranged normally with respect to the longitudinal axis of the partial fluid duct and being axially shiftable relatively to the housing. In difference to the afore described prior art the inventive device has a modular construction in which a distribution module, at least one filter module comprising the partial fluid duct and a final module are detachably connected with each other relatively to the flow direction of the fluid to be filtered. The distribution module comprises at least one distribution duct which connects the fluid supply duct, respectively the first connection area, with the partial fluid duct, whereas the final module comprises at least one outlet duct. Hereby this outlet duct extends between the partial fluid duct and the fluid removal duct, respectively the second connection area. In other words, in the inventive device firstly a distribution module, then at least one filter module and subsequently to that a final module are detachably connected with each other in a fluid-tight way relatively to the flow direction of the fluid to be filtered, so that the fluid to be filtered is led from the fluid supply duct over the at least one distribution duct of the distribution module, over the at least one partial fluid duct being located in the filter module and over the at least one outlet duct being located in the final module to the fluid removal duct, whereby the actual filtering in the inventive device is realized by the at least one filter being fixed by means of the axially shiftable bolt and being arranged within the partial fluid duct.

The inventive device shows a number of advantages. First of all the essential advantage is to be pointed out that, conditioned by the modular construction, the inventive device can be individually adjusted to the corresponding needs within a short term since, by arranging any number of filter modules between the distribution module and the final module, the required filtering surface can be correspondingly enlarged or reduced. Particularly if the inventive device comprises identical filter modules the production expenses of the inventive device can be essentially reduced since such identically formed filter modules can be produced in series in a simple and inexpensive way. The modular construction moreover allows that the corresponding ducts of the inventive device, as far as they are soiled or plugged by, for example, cracked plastic, are particularly easily accessible since the inventive device can be disassembled, cleaned and reassembled very rapidly because of the detachable connection. The modular construction furthermore allows that angled ducts being formed in a quite complicated way can be provided, which is also not possible in the prior art. If the flow behavior, particularly the viscosity, of the fluid to be correspondingly filtered is changed the inventive device can be easily adjusted to the corresponding conditions since the perfused duct diameters can be correspondingly enlarged by arranging several filter modules, so that particularly in the case of viscous fluids higher yields of filtered fluids can be obtained by increasing the number of filter modules. The increasing of the number of filter modules moreover causes an increase of the cleaning cycles of the filter surface containing soil particles, so that the inventive device allows a durable and troublefree production.

A further advantage of the inventive device is that the inventive device can easily and individually be adjusted to existing dimensions because of its modular construction, which can simply be obtained in the inventive device by arranging single filter modules being relatively compact particularly one behind the other, above each other and/or next to each other, so that correspondingly to that the existing space can be exploited in an optimum way. This advantage is particularly in the case when the inventive device is located between an extruder for the molten plastic and a tool or a corresponding nozzle since in the case of production machines the space between the extruder and the corresponding tool is predetermined and particularly the axial distance is limited.

As already described above, the filter modules can be arranged in different ways as far as the inventive device comprises at least two filter modules.

A particularly suitable embodiment of the inventive device provides that it comprises a multitude of filter modules which are arranged next to each other and/or above each other. Hereby preferably two to ten filter modules are arranged next to each other or above each other in such a way that the fluid to be filtered is entered preferably by a common distribution module being connected with the filter modules in a fluid-tight manner, whereby this distribution module comprises a number of distribution duct which corresponds to the number of filter modules. In this embodiment of the inventive device particularly a common final module is located downstream of the multitude of filter modules, whereby this final module also comprises a number of outlet ducts which corresponds to the number of filter modules. In this embodiment it is either possible to join the multitude of distribution ducts and/or the multitude of outlet ducts in the distribution module, respectively in the final module, to one single duct which is aligned with the fluid supply duct, respectively with the fluid removal duct or to abut each single distribution duct and each single outlet duct into the fluid supply duct, respectively into the fluid removal duct. This embodiment of the inventive device is used when the inventive device is applied for the filtering of molten plastics and when hereby only a limited distance which can not be modified exists between the extruder and the tool, respectively the nozzle, because of the way the machine is installed.

In a further embodiment of the inventive device the multitude of filter modules are arranged one behind the other relatively to the flow direction of the fluid to be filtered, whereby in this embodiment also preferably two to ten filter modules are arranged between the particularly one distribution module and the particularly one final module. In this embodiment of the inventive device the distribution module then comprises a single distribution duct and the final module comprises a single outlet duct, whereby this distribution duct can then be connected with the fluid supply duct or with the first connection area and whereby the outlet duct can then be connected with the fluid removal duct or with the second connection area. With the exception of the filter module which is located immediately at the distribution module and at the final module, each further filter module comprises a first connection duct upstream of the filter and second connection duct downstream of the filter, whereby the partial fluid duct extends between the first and the second connection duct. The filter module being located immediately at the distribution module only comprises the first connection duct and, if necessary, a section of the second distribution duct, whereas the filter module being located immediately at the final module only comprises the second connection channel and, if necessary, a section of the first distribution duct. The first and the second connection duct are arranged in that way that the first connection duct of each filter module generates a fluid connection between the distribution duct and the partial fluid duct upstream of the filter and that the second connection duct generates a fluid connection between the partial fluid duct and the outlet duct of the final module downstream of the filter. In other words, in this embodiment of the inventive device at least one filter module, preferably at least two filter modules, are provided between the distribution module and the final module, whereby these filter modules are arranged one behind the other relatively to the flow direction of the fluid to be filtered. In order to guarantee in this embodiment of the inventive device a regular supplying of the multimode of partial fluid duct in which the filters are located, each filter module, with the exception of the filter modules being located at the distribution module and at the final module, comprises corresponding first and second connection ducts, whereby the first connection ducts serve to enter the fluid to be filtered and the second connection ducts serve to remove the filtered fluid. In order to guarantee hereby a homogeneous distribution of the fluid stream to be filtered in the single filter modules, it is suitable to furthermore adjust the dimension of the distribution duct to the total sum of the penetration surfaces of the first connection ducts in such a way that the dimension of the distribution duct is essentially larger, particularly by the factor 5 to 20, than the total sum of the penetration surfaces of the first connection ducts. This embodiment of the inventive device is particularly applied when the inventive device is used for the filtering of a molten plastic and when hereby the distance between the extruder and a tool, respectively a nozzle, following the extruder is not limited.

In addition to the two afore indicated basic options, it is certainly also possible to arrange the multitude of filter modules one behind the other as well as next to each other and/or above each other between the distribution module and the final module. Hereby it is only required that the distribution module comprises a number of distribution ducts which corresponds with the number of the row of filter modules being arranged one behind the other and that the final module comprises a corresponding number of outlet ducts, whereas each filter module, with the exception of the two filter modules which are located immediately at the distribution module and at the final module, comprises the already afore described first and second connection ducts which connect the partial fluid ducts of each filter module with each other. Moreover the two filter modules which are located immediately at the distribution module comprise only the first connection duct being arranged upstream of the filter as well as, if necessary, a short section of the second distribution duct and the filter module which is located directly at the final module comprises the second connection duct being arranged downstream of the filter as well as, if necessary, a short section of the first connection duct, as this is already described above in detail. By applying such an embodiment of the inventive device it is possible to dispose in a very compact construction a filter capacity which can be realized in many variations.

In order to guarantee a fluid-tight connection of adjacent filter modules or a fluid-tight connection of the distribution module, respectively of the final module, with the corresponding filter module in the afore described embodiments of the inventive device in which the filter modules comprise a first connection duct and/or a second connection duct, several possibilities exist.

The connection ducts can be connected in a fluid-tight manner by means of corresponding connecting pieces which protrude into the corresponding duct of the one module as well as into the contacting duct of the other module, whereby it is advisable, however, to provide the inner diameter of these connecting pieces in such a way that their inner diameter corresponds with the inner diameter of the ducts. For obtaining this the end sections of the ducts are provided with a bore, so that they take up the corresponding connecting pieces without causing a narrowing of the ducts.

The fluid-tight connection of adjacent filter modules can, however, be realized by connecting the modules contacting each other in the duct areas by means of corresponding sealing surfaces, so that the required tightness is guaranteed by forming these sealing surfaces in a planar manner.

In respect to the alignment of the first connection duct relative to the second connection duct, it is suitable to arrange the first connection duct parallel to the second connection duct, so that hereby the length of the connection ducts is optimized.

In order to guarantee in the afore described embodiment of the inventive device a fluid-tight connection between the distribution module and the filter module, between the final module and the preceding filter module or between the two adjacent filter modules, a particularly advantageous embodiment of the inventive device provides such modules which comprise sealing surfaces on the corresponding connection surface. Hereby these sealing surfaces preferably cover the total area of the surfaces which contact each other when the modules are connected and thus when the inventive device is assembled.

In a particularly suitable and durable embodiment of the inventive device each filter module comprises a first sealing surface and a surface sealing surface which is arranged oppositely to the first sealing surface, so that two or more filter modules can be detachably connected with each other by means of these two sealing surfaces being arranged to each other. Moreover the corresponding first filter module can be detachably connected in a fluid-tight manner with the sealing surface being located at the distribution module by means of the first sealing surface, and the correspondingly last filter modules can be detachably connected in a fluid-tight manner with the sealing surface being located at the final module by means of the second sealing surface, without causing a particularly constructive effort.

In order to locate in the afore described embodiment of the inventive device any number of filter modules one behind the other, respectively next to each other, or above each other, it is advisable to arrange the first sealing surface and the second sealing surface mainly parallel to each other.

It is furthermore advantageous to arrange the partial fluid duct in the filter modules particularly in an inclined manner relative to the sealing surface in an angle $\alpha$ between 30° and 65°, whereas the first connection duct and the second connection duct extend mainly vertically to the sealing surface.

In order to standardize and possibly to minimize expenses for the hydraulic installation being required for the axial shifting of the bolt in the inventive device, it is particularly advantageous to form the partial fluid ducts being located in the multitude of filter modules in such a way that they are arranged parallel to each other.

Particularly if the inventive device comprises a multitude of filter modules having the same construction and comprising partial fluid ducts which are preferably arranged in the above described manner, this embodiment of the inventive device provides that the hydraulic installations being required for the shifting of the bolt can be simplified in that way that hereby as well standardized hydraulic installations having the same construction are used. A further minimization of the expenses can be obtained by the fact that the hydraulic installations being required for the shifting of the bolts are not provided in an amount which corresponds with the amount of bolts, but that hereby the hydraulic installation is used for several bolts, whereby the position of the hydraulic installation is adjusted to the corresponding bolt to be shifted if a shifting of this bolt is desired.

As already described above in the inventive device, the distribution module comprises optionally the fluid supply duct or preferably the first connection area for detachably connecting the distribution module in a fluid-tight manner with an existing fluid supply duct. Moreover the final module optionally comprises the fluid removal duct or preferably the second connection area, whereby the second connection area makes it possible to detachably connect the final module in a fluid-tight manner with an existing fluid removal duct.

It is already mentioned above that each filter module comprises a partial fluid duct in which a single axially shiftable bolt is located.

An essentially higher filtering capacity and at the same time only a small enlargement of the construction, however, is made possible by such an embodiment of the inventive device in which each filter module comprises two partial fluid ducts, whereby each partial fluid duct comprises an axially shiftable bolt. Hereby the fluid stream to be filtered is thus entered by means of the distribution module, split into two partial streams in each filter module, so that correspondingly to that such a filter module has a double capacity when being compared with such a filter module which comprises only one partial fluid duct.

As already described above for the embodiment of the inventive device in which each filter module comprises only one partial fluid duct, an advantageous development of the afore described embodiment of the inventive device in which each filter module comprises two partial fluid ducts contains in each filter module the afore described first connection duct upstream of the filter and the second connection duct downstream of each filter. Hereby, however, the filter module which abuts directly at the distribution module disposes eventually only of a short section of the second connection duct or not at all, whereas the other filter module which is located directly before the final module does not comprise a first connection duct. In order to obtain a simpler construction in this embodiment of the inventive device, the second connection duct is located and formed in such a way that it removes the filter fluid from both partial fluid ducts at the same time, whereas preferably two first connection ducts per filter module are arranged in that way that the fluid to be correspondingly filtered is entered into the partial fluid duct by means of a separate first connection duct.

As already described above, the reduction of the duct lengths can be obtained by arranging the common second connection duct parallel to the two first connection ducts.

A further increase of the filtering performance is obtained in the inventive device by forming the final module also as a filter module, whereby in this embodiment of the inventive device the final module then can optionally comprise one partial fluid duct or several, particularly two partial fluid ducts.

Particularly if in the afore described embodiment of the inventive device the outlet duct of the final module forms the second connection duct which then preferably comprises the second connection area for connecting with an existing fluid removal duct at its endside relatively to the flow distribution of the fluid to be filtered, this embodiment shows a high filtering capacity in the case of an extremely compact way of construction.

A particularly advantageous and variably applicable embodiment of the inventive device comprises at least two filters in bolts being arranged separately of each, whereby these filters can be optionally two filter modules with one corresponding partial fluid duct or one filter module with two corresponding partial fluid ducts. Hereby at least two fluid blocking elements are provided in the ducts upstream of the bolts, whereby these blocking elements are arranged and formed in that way that each blocking element can be moved between a first position in which the fluid stream to the two filters is not blocked and a second position in which the fluid stream to the two filters is interrupted. Moreover an outlet element is located between the blocking element and the corresponding filter, whereby in its opened position the outlet element leads a partial fluid stream into the atmosphere. Hereby this embodiment of the inventive device makes a continuous regeneration of the filters containing soil particles possible, whereby herefore one of the blocking elements is moved from its first position in which the fluid stream towards the filter is not blocked into a second position, so that the fluid stream towards the filter is interrupted. The corresponding other blocking element remains in its first position. After moving the outlet element into its opened position the fluid stream is reversed in the blocked duct by means of the back pressure induced by the tool or the nozzle, so that the filter can be perfused oppositely to the filtering direction by fluid being already filtered and so that the fluid thus containing soil particles can be removed by means of the opened outlet element into the atmosphere. This continuous regeneration or back rinsing of the filter, respectively of the filters, is subsequently described in detail in connection with the concrete embodiments.

In respect to the forming of the outlet elements there are several possibilities in the afore described embodiment. The first possibility provides that hereby the blocking element itself is formed as outlet element in such a way that the blocking element can be moved into a third position, whereby in this third position of the blocking element the fluid stream towards the filter is interrupted but whereby a reverse stream of the fluid from the filter to the blocking element and into the atmosphere by means of the blocking element is possible.

In order to realize such a blocking element, it is suitable to form the blocking element as axially shiftable or rotatable bolt, as this is described in detail in the DE 195 19 519 C2.

Another advantageous development of the afore described embodiment of the inventive device in which the filters can be back-rinsed provides that the bolt supporting the filter forms at the same time the blocking element and the outlet element. Hereby the three positions being described above are thus obtained by axially shifting the bolt, so that this embodiment of the inventive device does neither provide a separate blocking element nor a separate outlet element.

Another particularly advantageous development of the afore described back-rinsable embodiment of the inventive device provides that each partial fluid duct upstream of the filter comprises the outlet element, whereas, additionally in that, one further duct comprises a blocking element which can be shifted between the first position and the second position, as this is described above. Particularly if this outlet element can be adjusted in respect to its flow quantity, a controllable regeneration of the corresponding filter is made possible, so that hereby filtered fluid is not wasted.

Depending on the corresponding embodiment of the inventive device and particularly on the number of filter modules several possibilities exist to provide the afore described embodiments of the blocking elements and of the outlet elements in the corresponding ducts. A particularly inexpensive development of the inventive device provides that hereby a group of filters contains each a common blocking element and/or a common outlet element, so that the first group of filters is then commonly back-rinsed, whereas the other group of filters further guarantees the supply of filtered fluid to the final module.

If in this embodiment the distribution module is formed in such a way that it comprises at least two distribution ducts, such a group-wise back-rinsing of filters can be caused in a particularly simple manner by arranging one blocking element in each distribution duct.

If, however, it is desired to back-rinse each filter independently from the other filters, it is required that upstream of the filter each partial fluid duct supplying the corresponding filter comprises the blocking element and/or the outlet element.

In the afore described embodiments of the inventive device it was indicated that each bolt supports at least one filter. Independently of the size of each filter module and of the dimensions of the corresponding partial fluid duct it is possible, however, that each bolt supports at least two, preferably two to six filters, being arranged in an axial distance to each other, so that optionally several filters are perfused or exchanged at the same time, without making it necessary to interrupt the fluid stream.

The present invention is furthermore directed to a filter module for the use in the inventive device.

Hereby the filter module comprises a first and a second sealing surface for the fluid-tight and detachable fixing of a further filter module, of a distribution module or of a final module, whereby the filter module is provided with at least one partial fluid duct for taking up at least one filter being supported by means of an axially shiftable bolt. In order to enter the fluid to be filtered into the filter module and thus into the filter being located in the partial fluid duct, the inventive filter module moreover comprises a first connection duct which is located upstream of the filter. The partial fluid duct abuts downstream of the filter into a second connection duct, whereby the filtered fluid is led to the final module by means of this second connection duct.

The afore described inventive filter module shows the analogue advantages as being described above for the inventive device. As an essential advantage it is to be pointed out that the inventive filter module can be manufactured in series and particularly inexpensively when being constructed in an extremely compact manner. Even if the inventive filter module is directly fixed at the distribution module in a fluid-tight manner, a modification of the series construction is not necessary since in this case the second connection duct which is only partially required because of the fixing of the filter module at the distribution duct can easily be closed largely or completely, for example, by means of a correspondingly adjusted bolt. This bolt, however, can be removed in a relatively simple way, so that the second connection duct is again disposable. The same is the case for the filter module which is located directly at the final module with which the filter module is connected in a fluid-tight manner, whereby a part of the first connection duct is preferably closed by means of a correspondingly adjusted bolt.

As already mentioned above, the inventive filter module comprises preferably a first and a second sealing surface being aligned parallel to each other and being arranged oppositely. Hereby these two sealing surfaces make it possible in a particularly simple way that the filter modules can be connected with each other or that the filter module can be connected with the distribution module or with the final module in a detachable and fluid-tight manner, so that a device being constructed thereby can rapidly and easily be adjusted to the corresponding needs. The first connection duct and/or the second connection duct are particularly arranged vertically to the sealing surface, so that hereby the corresponding duct length is optimized.

A particularly compact and variably applicable embodiment of the inventive filter module provides that the filter module comprises two partial fluid ducts, whereby correspondingly to that two bolts belonging each to one partial fluid duct are provided.

A particularly space-saving construction is obtained in the inventive filter module by arranging the partial fluid ducts in an inclination angle α varying between 30° and 65°, preferably 45°, relatively to the connection ducts.

In a particularly suitable embodiment of the inventive filter module this filter module comprises two partial fluid ducts, whereby in this embodiment two first connection ducts are moreover provided which are arranged in a distance of each other. Hereby each first connection duct is located at the inlet of the two partial fluid ducts being located in a distance of each other, in such a way that a partial stream of the fluid to be filtered is entered into the partial fluid ducts by means of the two first connection ducts. Each partial fluid duct then abuts downstream of the filter into at least one second connection duct, so that correspondingly to that the filtered fluid is removed by means of this second connection duct. It is, however, particularly space-saving if the two second connection ducts are joined in one common second connection duct, whereby this joining of the two second connection ducts to one common second connection duct has the advantage of furtherly reducing the expenses of the production of the inventive filter module.

Advantageous developments of the inventive device as well as of the inventive filter module are indicated in the subclaims.

BRIEF DESCRIPTION OF THE DRAWINGS

The inventive device as well as the inventive filter module are subsequently described in detail in connection with the drawings. The following figures show.

In the FIGS. 1 to 16 the same parts are marked with the same reference numbers.

DETAILED DESCRIPTION OF THE INVENTION

Figure 1:
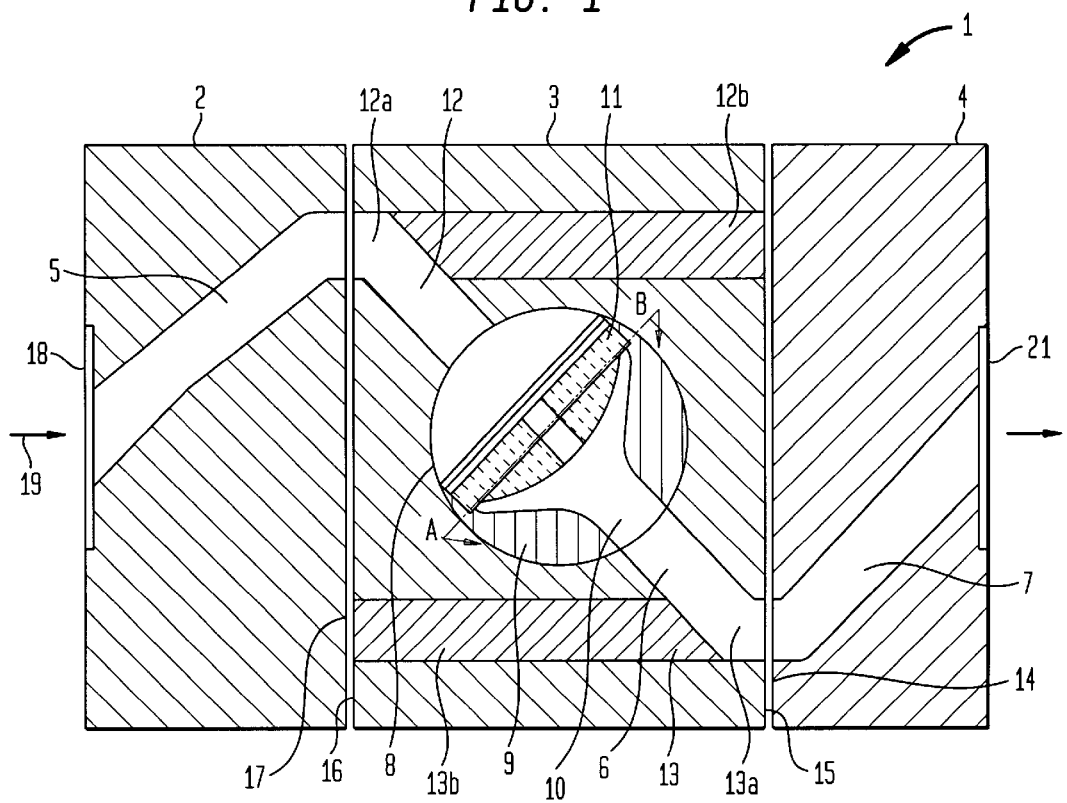
FIG. 1 a schematical, sectional side view of a first embodiment with one filter module.

The device being generally marked with 1 in FIG. 1 comprises a distribution module 2, one filter module 3 as well as a final module 4, whereby the distribution module 2 comprises distribution duct 5, the filter module 3 comprises a partial fluid duct 6 and the final module 4 comprises a single outlet duct 7. Within the partial fluid duct 6 an axially shiftable bolt 9 is provided in a bore 8 which extends vertically to the plane of depiction, whereby the axially shiftable bolt 9 has a sparing 10 which extends radially through the whole material thickness, whereby at least one filter 11 being arranged vertically to the flow direction of the fluid in the partial fluid duct 6 is located in this sparing 10.

Moreover the filter module 3 comprises a first connection duct 12 as well as a second connection duct 13, whereby the first connection duct 12 is located upstream of the filter 11 and the second connection duct 13 downstream of the filter 13.

The filter module 3 is provided with a first sealing surface 16 on its surface which is directed towards the distribution module 2 and with a second sealing surface is on its surface which is directed towards the final module 4, whereby corresponding sealing surfaces 17 and 14 being arranged at the distribution module 2 and at the final module 4 are adjusted to the sealing surfaces 16 and 15 in such a way that the device 1 can be assembled in a detachable and fluid-tight manner by means of these sealing surfaces 14 to 17.

The device shown in FIG. 1 operates in the following way.

Starting from a fluid supply duct which is not shown and which is connected in a fluid-tight way with the distribution module 2 by means of the first connection area 18, the fluid to be filtered is entered in arrow direction 19 into the distribution duct 5 of the distribution module 2. This fluid to be filtered then flows through a section 12*a* of the first connection duct 12 into the partial fluid duct 6, reaches the sparing 10 and is then filtered by the filter 11 being vertically arranged within the partial fluid duct 6, so that at the outlet of the partial fluid duct 6 the filtered fluid is led to the outlet duct 7 of the final module 4 over a section 13*a* of the second connection duct 13.

The second connection area 21 is provided at the outlet of the outlet duct 7, whereby by means of this second connection area 21 the final module 4 is connected with a fluid removal duct which then abuts into a corresponding tool or nozzle (not shown).

In order to avoid that the areas of the first connection duct and of the second connection duct which are not perfused by the fluid get soiled, for example, with cracked plastic, bolts 12*b*, respectively 11*b*, are provided in these areas of the first connection duct 12 and of the second connection duct 13, whereby these bolts 12*b*, respectively 13*b*, close the duct areas which are not used.

Figure 2:
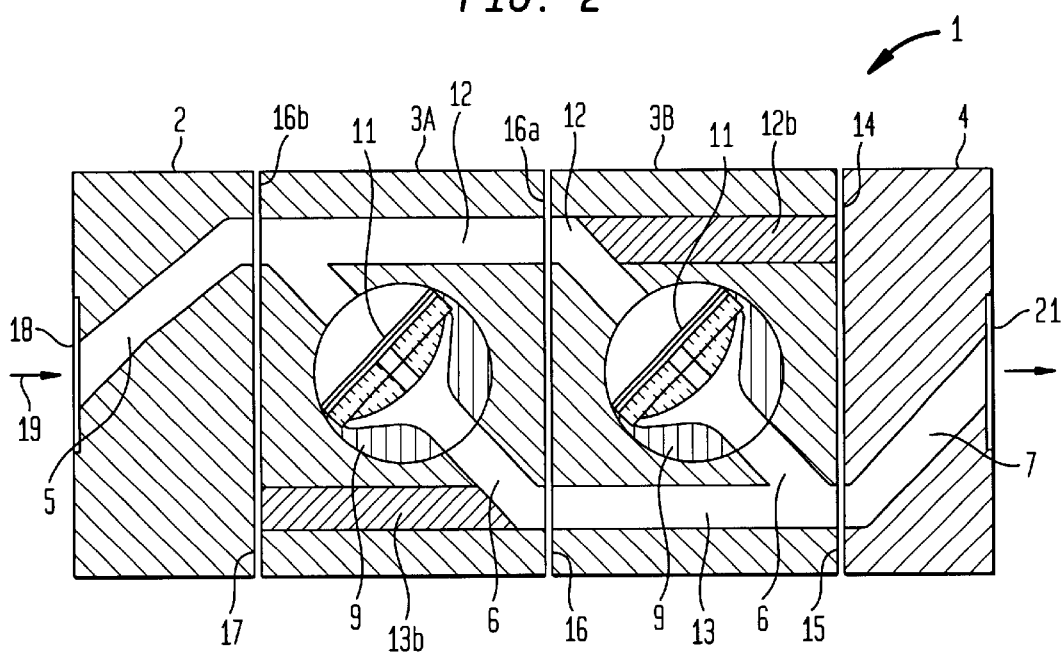
FIG. 2 a schematical, sectional side view of a second embodiment with two filter modules.

The embodiment shown in FIG. 2 differs from the afore described embodiment shown in FIG. 1 in that way that hereby not only one filter module but two filter modules 3A and 3B are provided, whereby these two filter modules 3A and 3B are connected in a fluid-tight manner with each other by means of the sealing surfaces 14, 15, 16, 16*a*, 16*b* and 17 and as a whole the two filter modules 3A and 3B are connected in a fluid-tight manner with the distribution module 2 by means of the sealing surfaces 16*b* and 17 as well as with the final module 4 by means of the sealing surfaces 14 and 15.

The filter modules 3A and 3B are essentially constructed as this is described above in FIG. 1 for the filter module 3. Hereby, however, the difference to the filter module 3 shown in FIG. 1 is that in the case of the filter module 3A (FIG. 2) the first connection duct 12 is not closed by means of a bolt 12*b* being fit in, whereas, however, in the case of the filter module 3B (FIG. 2) the first connection duct 12 is closed by means of a bolt 12*b* being fit in, as this is described above in figure for the filter module 3. In contrary to the afore described filter module 3 (FIG. 1) the second connection duct 13 of the filter module 3B shown in FIG. 2 is not closed by means of a bolt, as this is the case for the filter module 3 described in FIG. 1.

The embodiment shown in FIG. 2 operates in the following way.

After fluid-tightly connecting the distribution module 2, the two filter modules 3A and 3B as well as the final module 4 by means of the corresponding sealing surfaces 14, 15, 16, 16*a*, 16*b* and 17 the device is arranged within the flow of the fluid to be filtered in that way that the first connection area 18 is directed towards and fluid-tightly connected with the fluid supply duct and the second connection area 21 towards the fluid removal duct.

The fluid to be filtered entering in arrow direction 19 first of all flows into the first connection duct 12 of the first filter module 3A as well as into the first connection duct of the second filter module 3B by means of the distribution duct 5, whereby it is then homogeneously distributed into the partial fluid ducts 6 of the two filter modules 3A and 3B. The corresponding filtering of the fluid is then realized in the partial fluid ducts 6 by means of the filters 11 bring arranged therein and being described above in the FIG. 1, so that the filtered fluid is gathered at the outlet of the partial fluid duct 6 in the second connection ducts 13 of the filter module 3A and of the filter module 3B whereafter the filtered fluid flows into the outlet duct 7 of the final module 4. Subsequently to that the filtered fluid reaches the fluid removal duct (not shown) by means of the second connection area 21 and flows then to a tool or to a nozzle, both not being shown.

Figure 3:
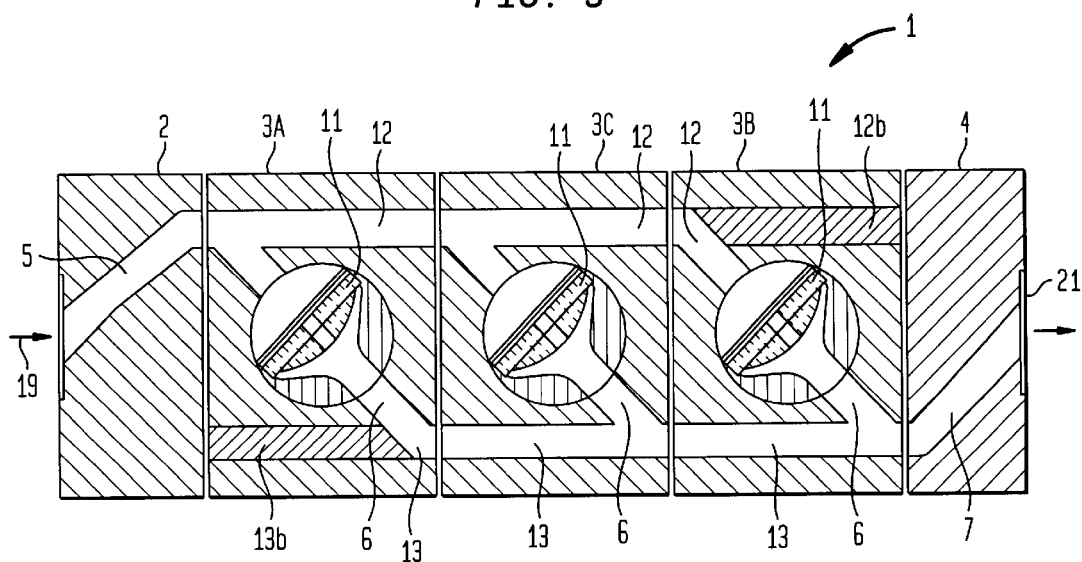
FIG. 3 a schematical, sectional side view of a third embodiment with three filter modules.

The third embodiment of the device 1 shown in FIG. 3 differs from the embodiment described in FIG. 2 in that way that in the case of the embodiment shown in FIG. 3 three filter modules 3A, 3B, 3C are provided which are connected with each other as well as with the distribution module 2 and with the final module 4 in a fluid-tight manner by means of corresponding sealing surfaces. Hereby the distribution module 2, the first filter module 3A and the third filter module 3B as well as the final module 4 are constructed as this is described above in FIG. 2.

The device 1 shown in FIG. 3 additionally comprises one middle filter module 3C, whereby the middle filter module 3C comprises a first upper connection duct 12 as well as a second lower connection duct 13, whereby both connection ducts 12 and 13 are not closed.

The device shown in FIG. 3 operates as this is described above for the device shown in FIG. 2, whereby, however, the difference of the device 1 shown in FIG. 3 is that the fluid to be filtered and being entered in arrow direction 19 by means of the distribution duct 5 is not only distributed into two filter modules 3A and 3B but into three filter modules 3A, 3C and 3B, whereby for the distribution of the not yet filtered fluid into the three partial filter ducts 6 the first connection ducts 12 being arranged within each filter module are used.

Subsequently to that the filtered fluid is gathered downstream of each filter 11 in the second connection duct 13 of each filter module and is then led to the outlet duct 7 of the final module 4, whereby the filtered fluid reaches the fluid removal duct by means of the second connection area 21 from where it flow to a tool or to a nozzle, both not being shown.

Figure 4:
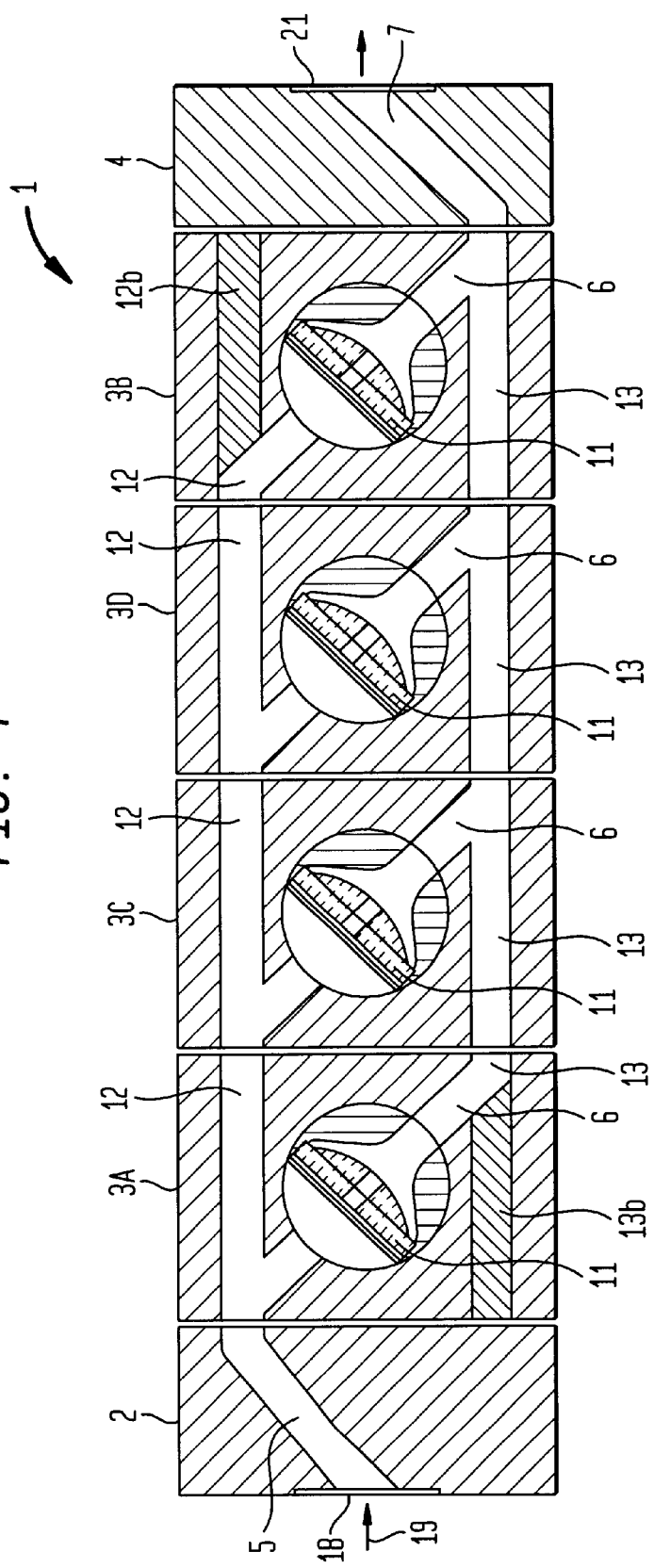
FIG. 4 a schematical, sectional side view of a fourth embodiment with four filter modules.

The fourth embodiment of the device 1 shown in FIG. 4 is constructed the same way as the embodiment shown in FIG. 3, however, with the difference that, instead of three filter modules, hereby four filter modules 3A, 3C, 3D and 3B are arranged between the distribution module 2 and the final module 4.

The filter modules 3A and 3B are constructed as this is described above for the filter modules 3A and 3B in FIG. 2.

The two middle filter modules 3C and 3D (FIG. 4) have the construction as it is described above for the filter module 3C in FIG. 3.

The function of the fourth embodiment shown in FIG. 4 corresponding with the function of the third embodiment of the device 1 described in FIG. 3, whereby, however, in the case of the fourth embodiment shown in FIG. 4 the fluid entering in arrow direction 19 is not only distributed on three filter modules but on four filter modules.

The embodiments of the device described above and shown in the FIGS. 1 to 4 comprise filter modules which are arranged one behind the other relatively to the flow direction of the fluid to be filtered. These embodiments are used when a sufficiently large distance is provided between the fluid supply duct and the fluid removal duct, as particularly a sufficiently large distance between the extruder and the tool, respectively a nozzle, being arranged distantly from the extruder, so that correspondingly to that such an axial prolongation of the fluid filtering device 1 does not cause problems.

Figure 5:
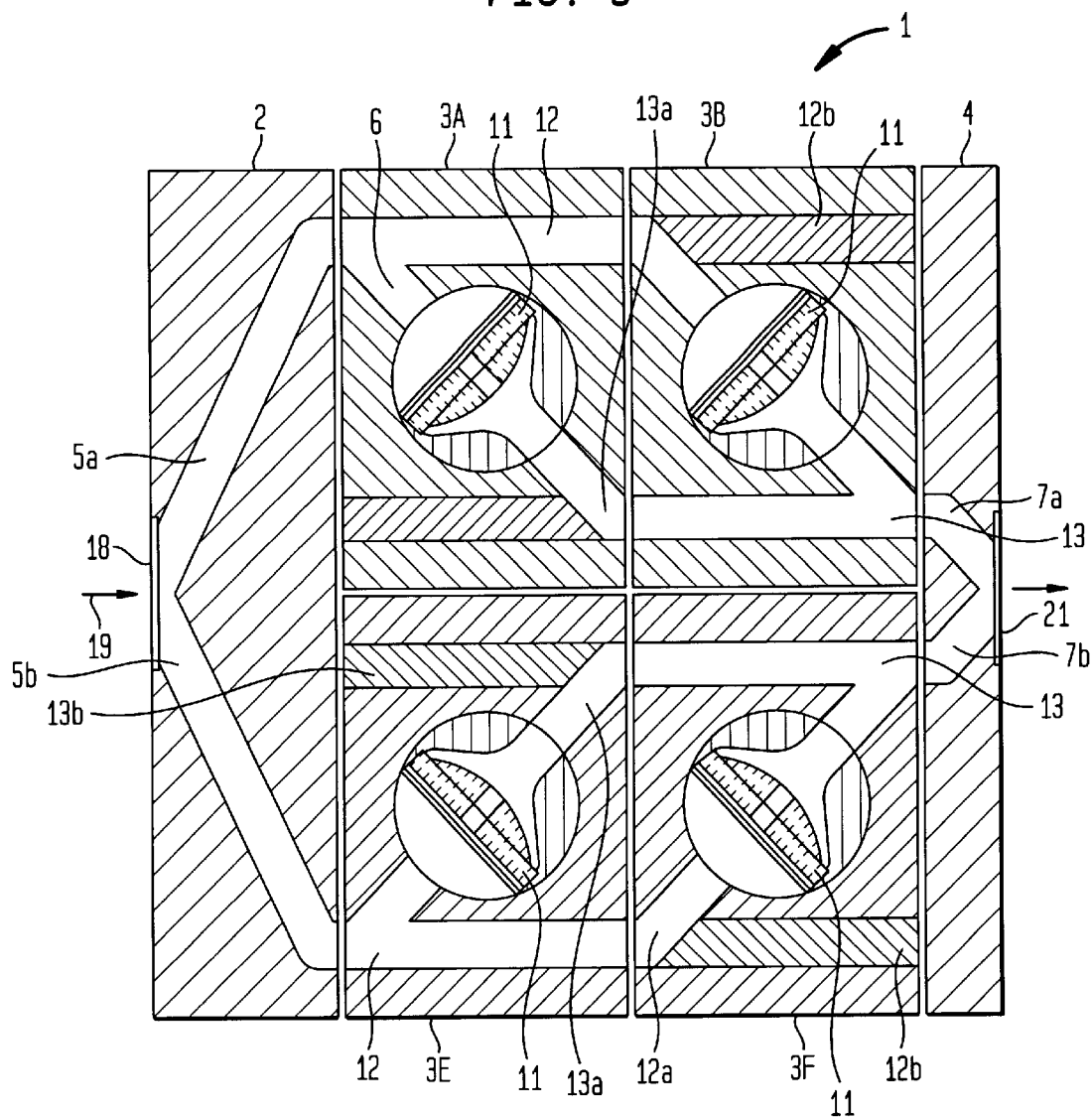
FIG. 5 a schematical, sectional side view of a fifth embodiment with four filter modules being arranged in pairs.
Figure 6:
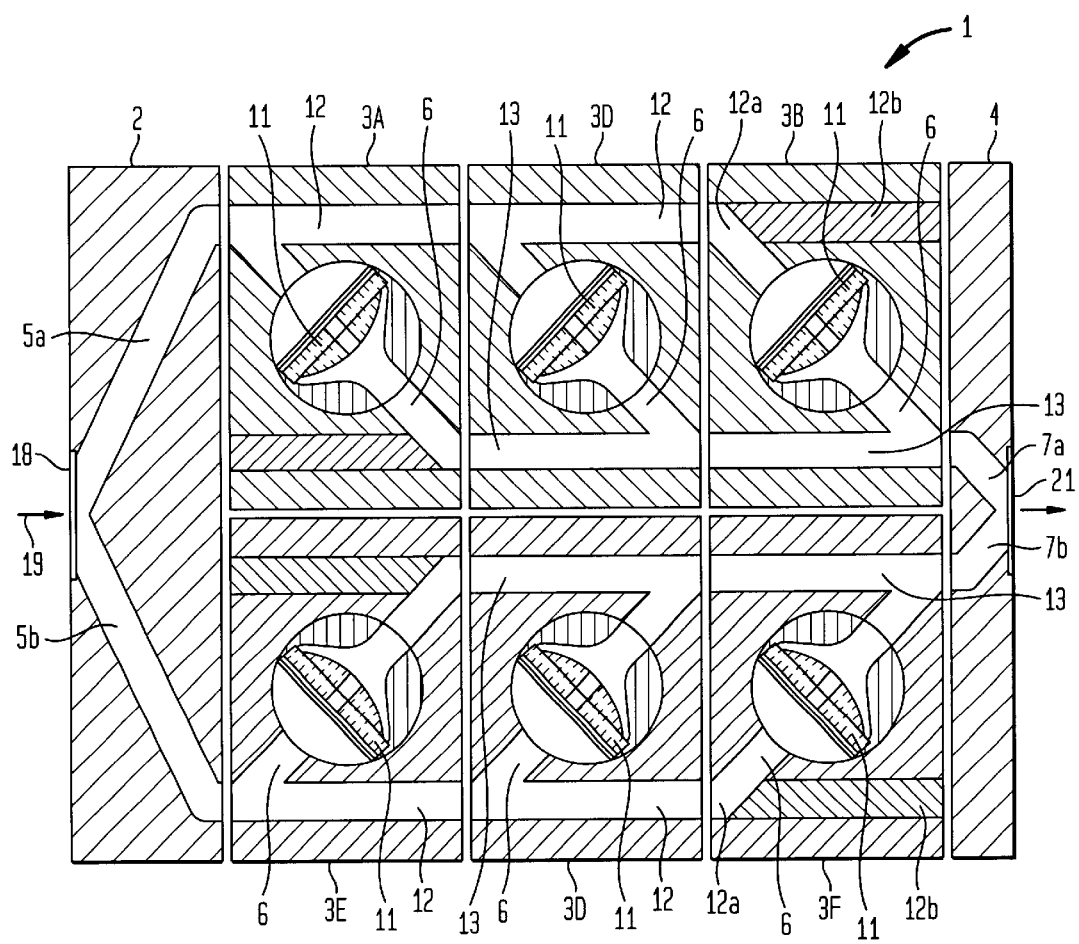
FIG. 6 a schematical, sectional side view of a sixth embodiment with six filter modules being arranged in pairs.
Figure 7:
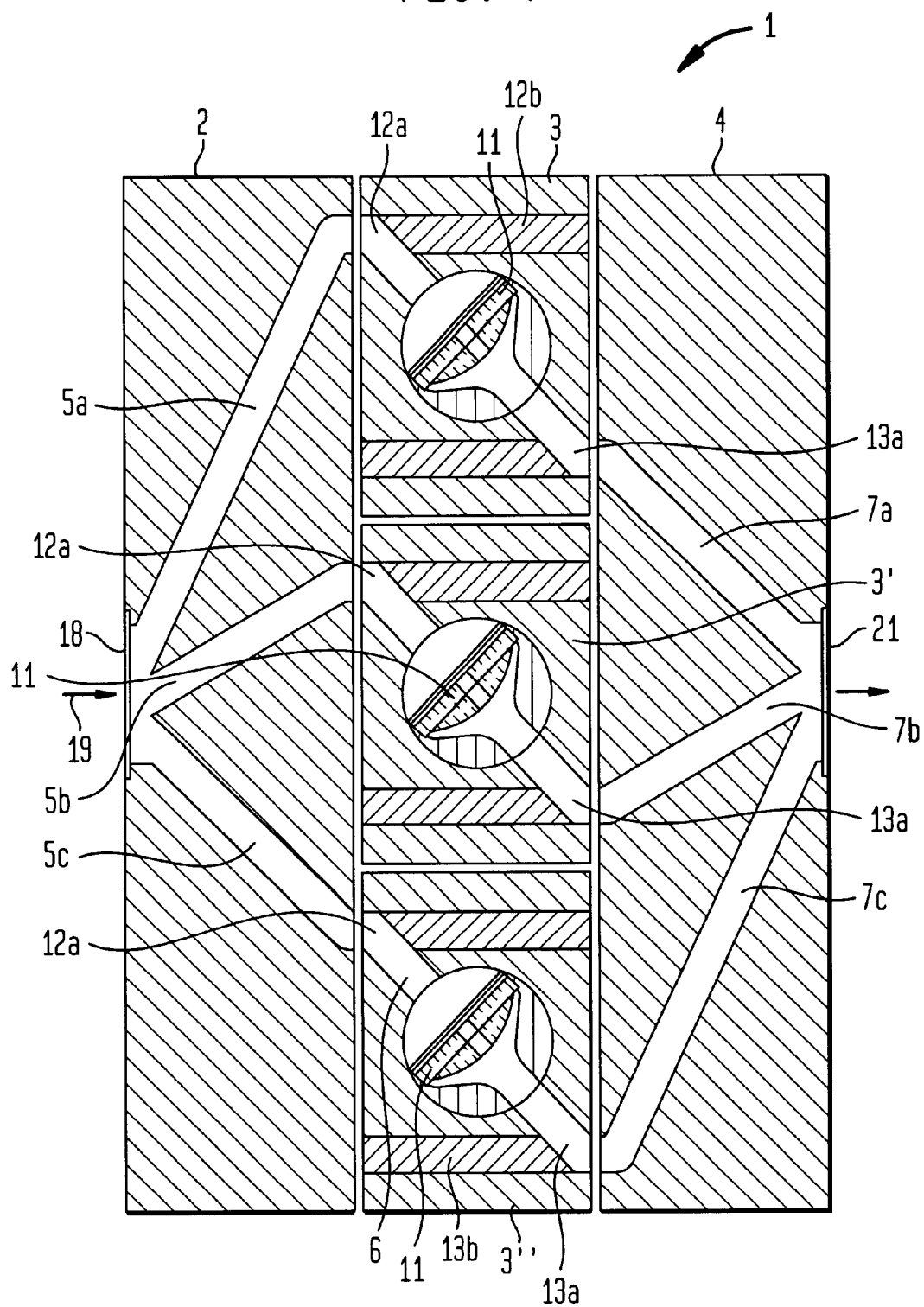
FIG. 7 a schematical, sectional side view of a seventh embodiment with three filter modules being arranged one above the other.
Figure 8:
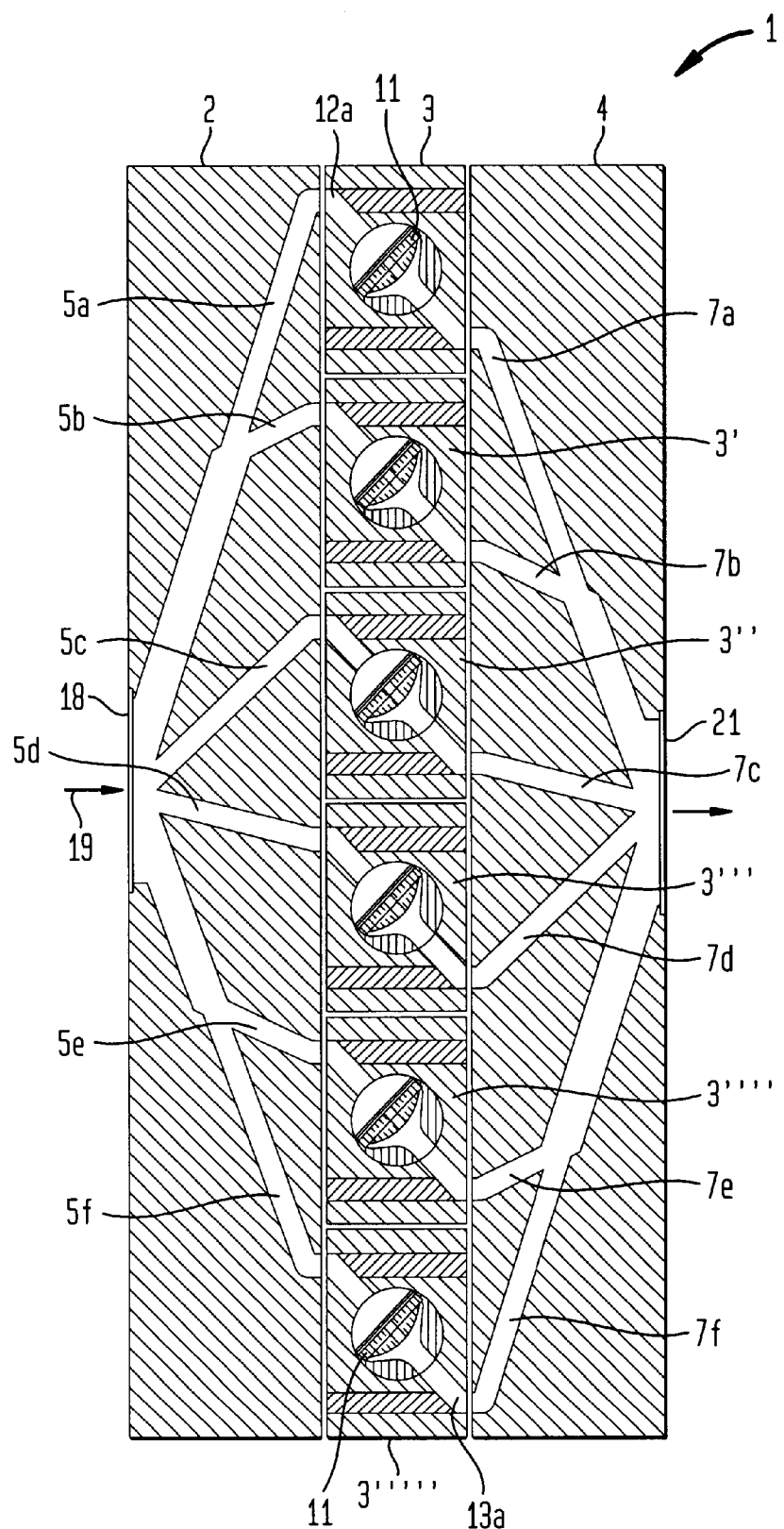
FIG. 8 a schematical, sectional side view of a eighth embodiment with six filter modules being arranged one above the other.

If, however, only a limited space is available in the axial direction between the fluid supply duct and the fluid removal duct, such embodiments of the device are used as they are shown in the FIGS. 5 and 6 or in the FIGS. 7 and 8.

Like the afore described embodiments, the embodiment of the device being generally marked with 1 and being shown in FIG. 5 comprises a distribution module 2 as well as a final module 4, whereby four filter modules 3A, 3B, 3E and 3F are arranged between the distribution module 2 and the final module 4.

Like already described above in detail, these four filter modules are connected with the final module 4 and with the distribution module 2 as well as with each other by means of corresponding sealing surfaces. The filter module 3A and 3B corresponds with the filter modules 3A and 3B as they are described above in connection with the fourth embodiment (FIG. 4).

In the case of the filter module 3E a second connection duct 13 is closed by a bolt 13b, so that only a first area 13a is provided for the filtered fluid.

In the case of the filter module 3F a back area of the first connection duct 12 is also closed by a bolt 12b, so that hereby only a front area 12a of the first connection duct 12 is perfused by the fluid.

The filter modules 3E and 3F have the same construction.

In contrary to the embodiments described above in the FIGS. 1 to 4, the distribution module 2 shown in FIG. 5 comprises two distribution ducts 5a and 5b, whereas the final module 4 contains as well two outlet ducts 7a and 7b.

If the fifth embodiment of the device 1 shown in FIG. 5 is used, the fluid to be filtered is firstly entered in arrow direction 19 into the distribution module 2, whereby the distribution ducts 5a and 5b distribute the fluid in two homogeneous partial fluid streams.

The fluid to be filtered flows from the distribution ducts 5a and 5b to the partial fluid ducts 6 by means of the first connection ducts 12 of the upper filter modules 3A and 3B as well as by means of the first connection ducts 12 of the lower filter modules 3E and 3F, whereby the partial fluid ducts 6 are provided in each filter module 3A, 3B, 3E and 3F. The filtered fluid then abuts downstream of the filters 11 into the second connection duct 13a, respectively 13, whereby the two partial fluid streams of the filtered fluid then flow to the outlet ducts 7a and 7b in the final module 4. Subsequently to that the filtered fluid reaches the fluid removal duct (not shown), respectively a tool or a nozzle being arranged at the fluid removal duct, by means of the second connection area 21.

The embodiment of the device 1 shown in FIG. 6 differs from the fifth embodiment shown in FIG. 5 in that way that in the case of the sixth embodiment six filter modules are provided which are arranged above each other and connected in a row. Hereby the sixth embodiment (FIG. 6) comprises filter modules 3A, 3B, 3E and 3F being already described above, whereas a further filter module 3D is located between the filter modules 3A and 3B as well as a further filter module 3D between the filter modules 3E and 3F, whereby these two filter modules 3D have the same construction as the filter modules 3C or 3D being described above in connection with the fourth embodiment (FIG. 4).

The distribution module 2 and the final module 4 both being shown in FIG. 6 do not differ from the fifth embodiment (FIG. 5).

The devices 1 shown in the FIGS. 7 and 8 and subsequently described in detail are particularly used if the axial distance between the fluid supply duct and the fluid removal duct is quite small.

The seventh embodiment of the device 1 shown in FIG. 7 comprises three filter modules 3, 3' and 3", whereby the three filter modules 3, 3' and 3" are located in a fluid-tight manner between a distribution module 2 and a final module 4. Hereby these filter modules 3, 3' and 3" are constructed as this is described above in connection with the first embodiment (FIG. 1).

The distribution module 2 of the seventh embodiment comprises three distribution ducts 5a, 5b and 5c and the final module 4 comprises three outlet ducts 7a, 7b and 7c, whereby the outlet ducts are joined in the connection area 21. The same is the case for the abutment area of the distribution ducts 5a, 5b and 5c which are joined in the first connection area 18.

The fluid to be filtered is entered in arrow direction 19 and distributed in three homogeneous partial fluid stream by means of the distribution ducts 5a, 5b and 5c. Subsequently to that the thus distributed fluid flows to the three identically constructed filter modules, whereby the distribution ducts 5a, 5b and 5c lead the fluid to the corresponding partial fluid ducts 6 by means of the connection duct area 12a. The filtered fluid is then led downstream of the filters 11 to the corresponding outlet duct 7a, 7b, respectively 7c, by means of the second connection duct area 13a, whereby the filtered fluid is joined in a common duct area in the second connection area 21, in order lead it hereafter to a following fluid removal duct, to a tool, respectively to a nozzle, by means of the second connection area 21.

The embodiment shown in FIG. 8 differs from the seventh embodiment (FIG. 7) in that way that in the case of this embodiment according to FIG. 8 not only three filter modules but six identically constructed filter modules 3, 3', 3", 3''', 3'''', 3''''' are provided. Moreover the distribution module comprises six distribution ducts 5a to 5f, whereas the final module 4 comprises six outlet ducts 7a to 7f. The six filter modules are arranged above each other.

Starting form the seventh embodiment, the filter capacity of the eighth embodiment can correspondingly be increased since the axial distance between the first connection area 18 and the second connection area 21 is identical. The eighth embodiment shown in FIG. 8 operates as this is described above in FIG. 7.

The ninth to the thirteenth embodiment of the device 1 being subsequently described in connection with the FIGS. 9 to 13 differ from the afore described embodiments shown in the FIGS. 1 to 8 in that way that in the case of the ninth to the thirteenth embodiment the filter module does not only comprise one partial fluid duct but two partial fluid ducts.

Figure 9:
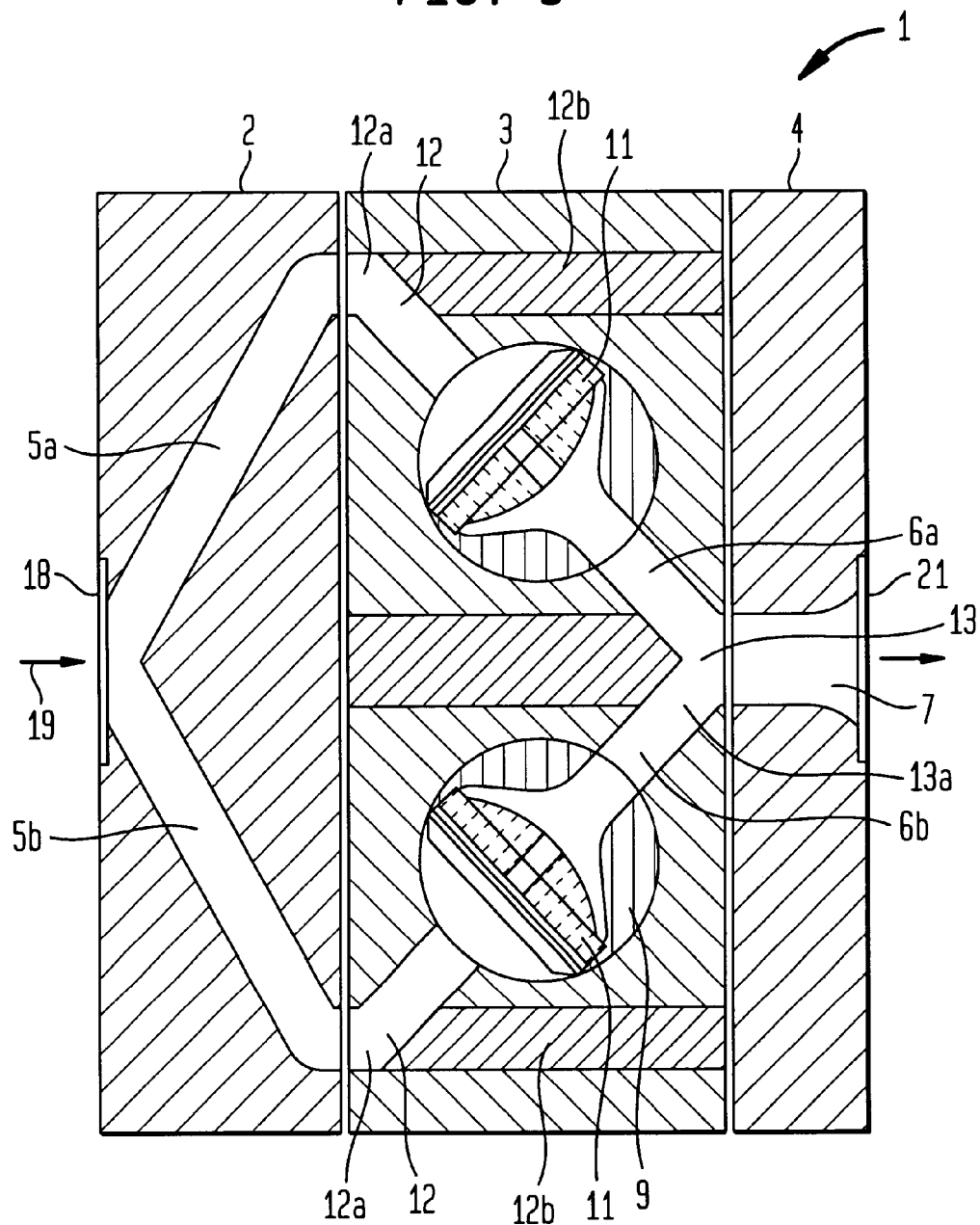
FIG. 9 a schematical, sectional side view of a ninth embodiment with one filter module comprising two partial fluid ducts.

The ninth embodiment shown in FIG. 9 is the simplest realization of this construction series. Hereby the ninth embodiment comprises a distribution module 2, a filter module 3 as well as a final module 4, whereby the distribution module 2 is provided with two distribution ducts 5a and 5b. The distribution duct 5a abuts into a first area 12a of the first connection duct 12 upstream of the flow direction 19 of the fluid to be filtered, whereas the lower distribution duct 5b also abuts into a first area 12a of a lower first connection duct 12. In both cases the partial fluid duct 6a, respectively 6b, of the filter module 3 follows next, whereby at least one filter 11 is located in this partial fluid duct 6a, respectively 6b, whereby the construction does not differ from the construction being described in detail in the FIG. 1.

The partial fluid ducts 6a and 6b are joined downstream of the filter 11 in an area 13a of the second connection duct, whereby the second common connection duct 13 then abuts into the common outlet duct 7 of the final module 4.

As already described several times, the areas of the first connection duct as well as the areas of the second common connection duct are closed, whereby for that purpose a correspondingly formed bolt is used is which is preferably fit in and which can be removed if necessary.

Figure 10:
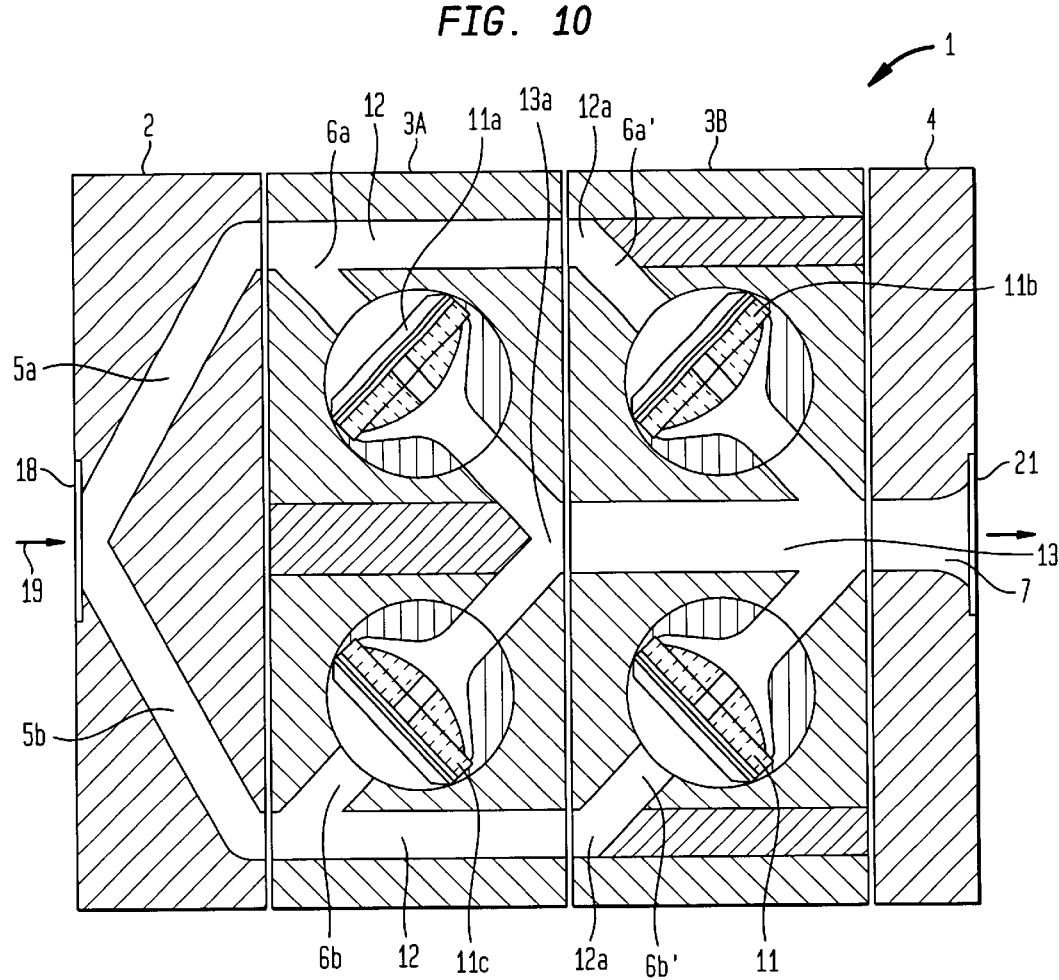
FIG. 10 a schematical, sectional side view of a tenth embodiment with two filter modules comprising each two partial fluid ducts.

In difference to the afore described ninth embodiment (FIG. 9), the tenth embodiment of the device 1 shown in the FIG. 10 does not only comprise one filter module but two filter modules, whereby these filter modules are generally marked with 3A and 3B.

Since the distribution module 2 and the final module 4 of the tenth embodiment shown in FIG. 10 correspond with the distribution module 2 and with the final module 4 of the afore described ninth embodiment, it is to be referred to the corresponding explanations in FIG. 9 in order to avoid repetitions.

The first filter module 3A relative to the flow direction 19 (arrow direction) of the fluid to be filtered comprises an upper first connection duct 12 and a lower first connection duct 12, whereby four partial fluid ducts 6a and 6b and 6a' are 6b' are arranged between these two connection ducts (lower and upper connection duct). The supply of the partial fluid ducts 6a, 6b, 6a' and 6b' is realized by means of the two connection ducts 12, 12a, whereby the fluid to be filtered is entered into these two first connection ducts 12 by means of two distribution ducts 5a and 5b of the distribution module 2. The partial fluid ducts 6a, 6b, 6a' and 6b' then abut downstream of the corresponding filters 11, 11a, 11b and 11c into a common second connection duct 13a, 13, whereby the common second connection duct is connected in a fluid-tight manner with one outlet duct 7 of the final module 4.

In order to avoid an undesired soiling of the unused areas of the first and the second connection duct, the corresponding duct areas are closed in a fluid-manner by means of adjusted bolts.

Figure 11:
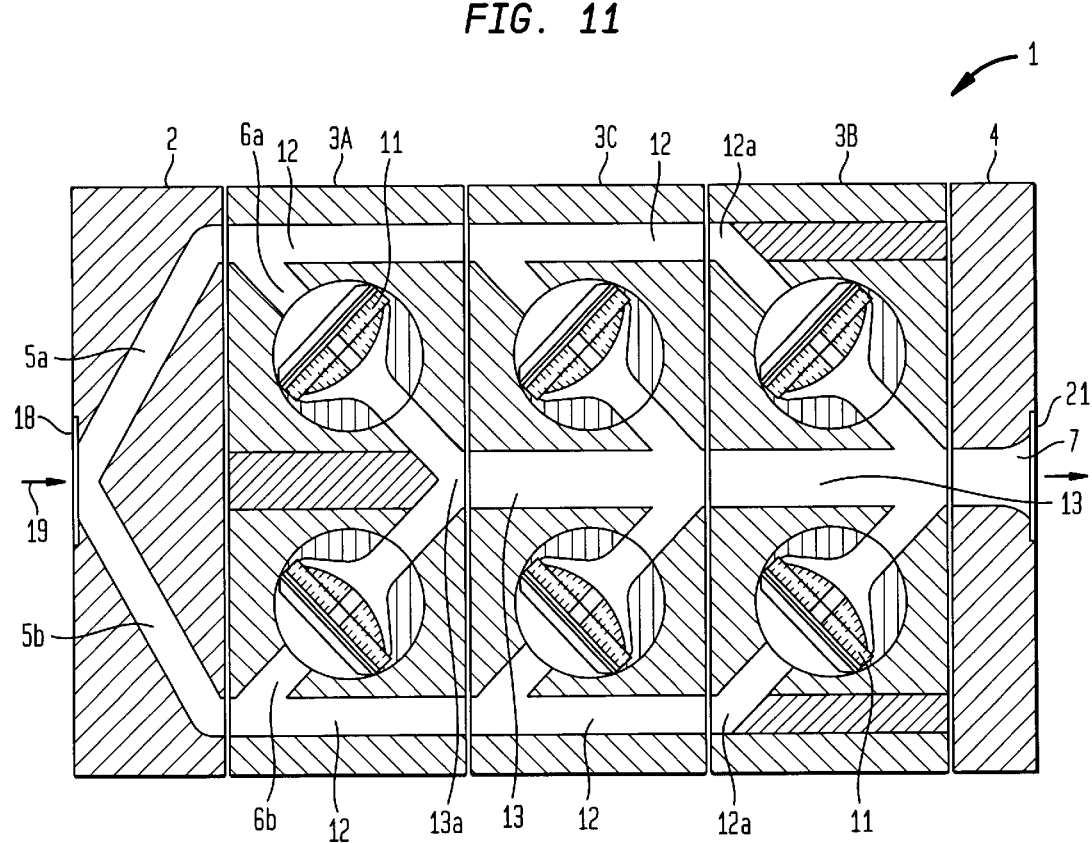
FIG. 11 a schematical, sectional side view of a eleventh embodiment with three filter modules comprising each two partial fluid ducts.

The eleventh embodiment of the device 1 shown in FIG. 11 differs from the afore described tenth embodiment of the device 1 in that way that in the cast of the eleventh embodiment of the device 1 a third filter module 3C is additionally provided between the filter module 3A and the filter module 3B, whereby this third filter module 3C is principally constructed as this is described above for the filter modules 3A and 3B. The only difference between the filter modules 3A, respectively 3B, and the filter module 3C of FIG. 11 is that the filter module 3C does not comprise first and second connection duct areas being closed by means of bolts since hereby the first upper and the first lower connection duct have to be permeable to fluid for the supply of the filter module 3B being arranged downstream and the second common collection duct 13 has to be permeable to fluid for the emptying of the preceding filter module 3A. The eleventh embodiment shown in FIG. 11 operates as the afore described embodiments of the FIGS. 9 and 10.

In connection with the FIGS. 9 to 11 of the device three embodiments were precedently described which are used if the axial distance between the first connection area 18, respectively the fluid supply duct, and the second connection area 21, respectively the fluid removal duct, is not limited, If, however, this distance is limited, such embodiments of the device are used as this subsequently described by the FIGS. 12 and 13.

Figure 12:
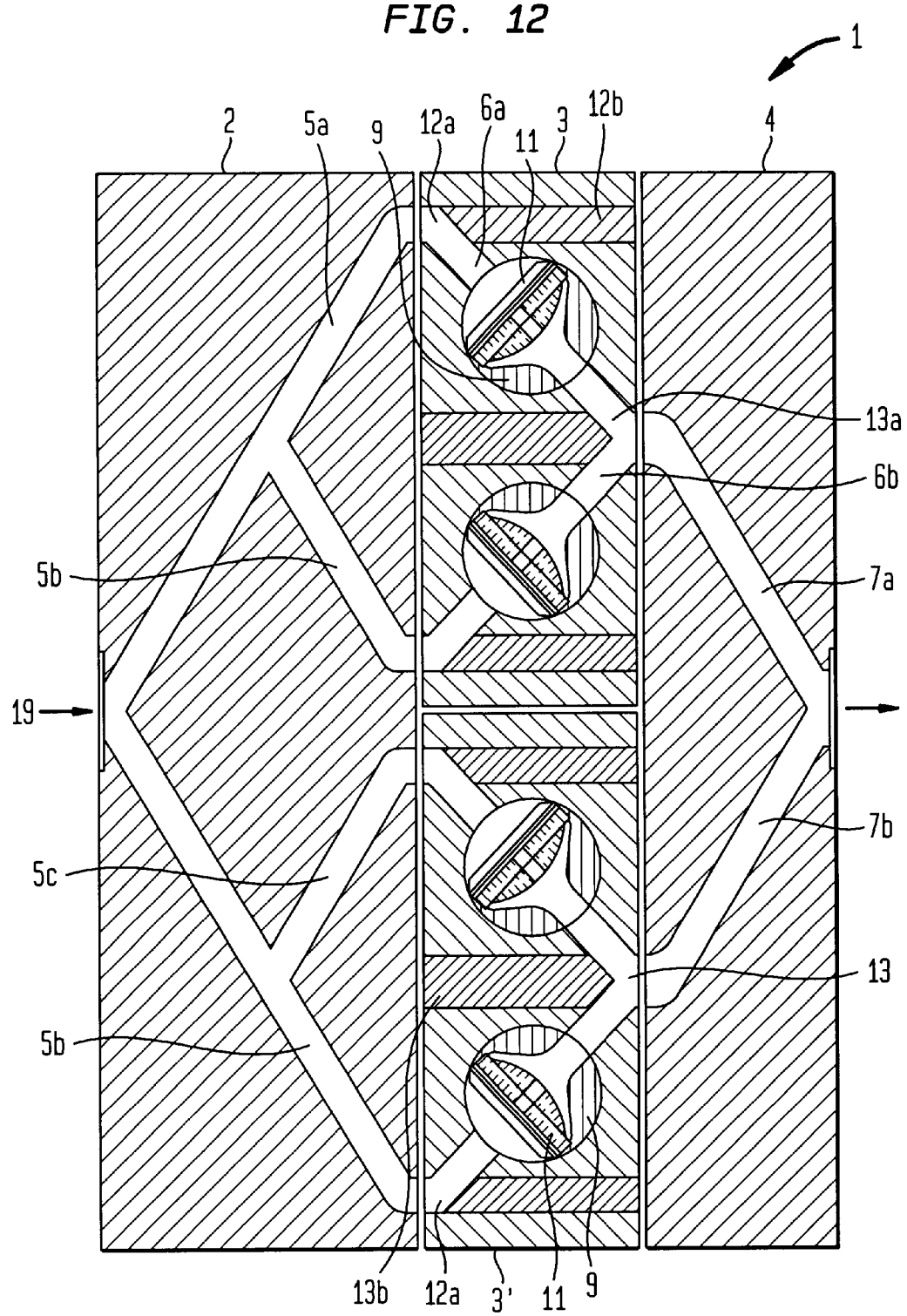
FIG. 12 a schematical, sectional side view of a twelfth embodiment with two filter modules being arranged above each other and comprising each two partial fluid ducts.

The twelfth embodiment of the device 1 shown in FIG. 12 comprises two filter modules 3, 3' being arranged one above the other, whereby the two filter modules 3, 3' have the same construction and comprise each two partial fluid ducts 6a and 6b. Corresponding filters are located in corresponding bolts 9 within these partial fluid ducts 6a, respectively 6b, as this is described above and in detail in FIG. 1. A distribution module 2 is provided upstream of the filter modules 3, respectively 3', whereby the distribution module 2 disposes of four distribution ducts 5a to 5d. These distribution ducts 5a to 5d then abut into an area 12a of an upper first connection duct 12, respectively into an area 12a of lower connection duct 12, from where the fluid is then led into the partial fluid ducts 6a and 6b of each filter module.

Subsequently to that the partial fluid ducts 6a and 6b are joined downstream of the filter 11 in a common second connection duct 13 which again abuts into the outlet duct 7a, respectively 7b, of the final module 4. The two outlet ducts 7a and 7b are then joined before the second connection area 21.

Un order to avoid an undesired soiling of the areas of the first and second connection ducts 12, respectively 13, not being perfused, these areas are closed preferably by means of an adjusted bolt 12b and 13b.

Figure 13:
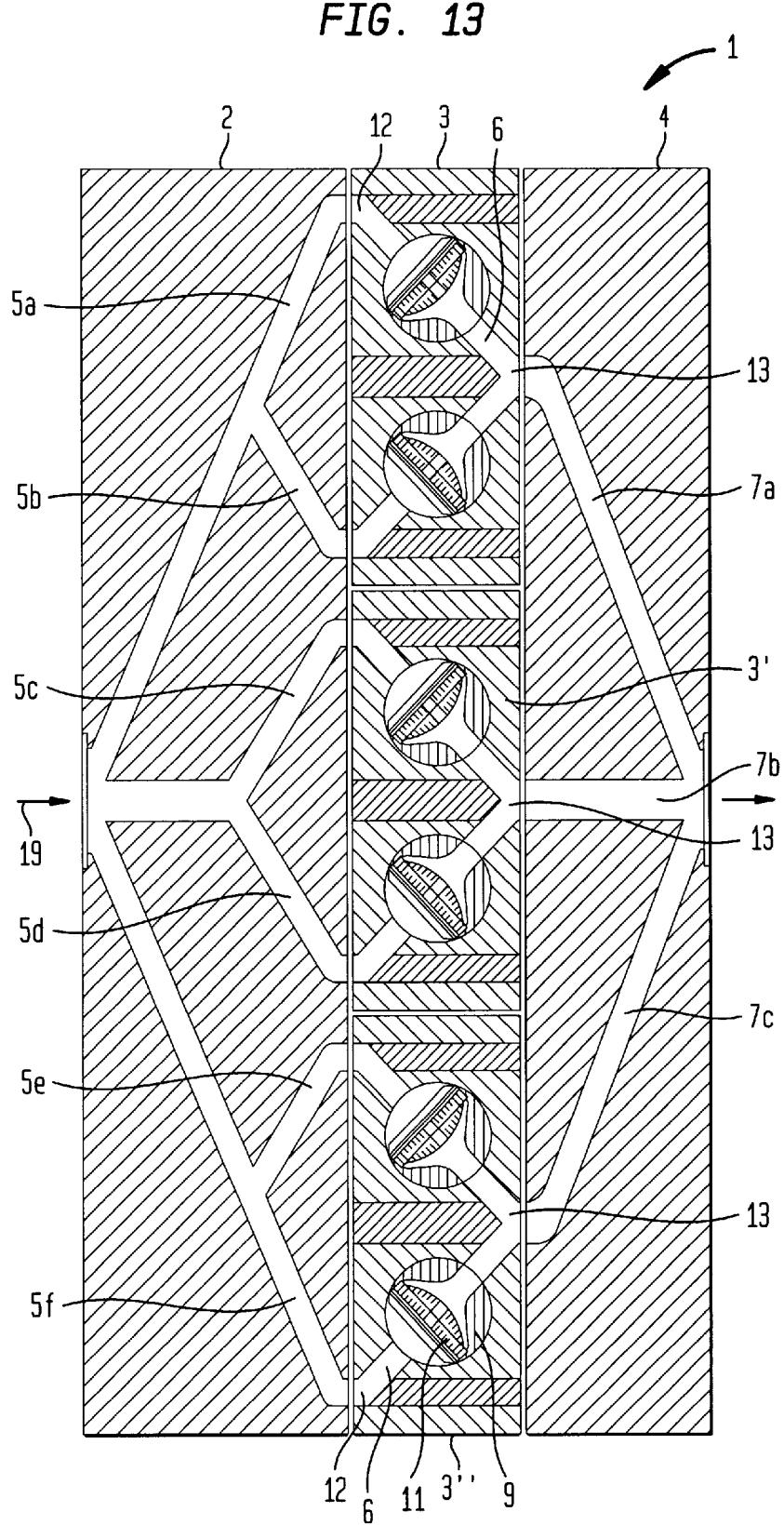
FIG. 13 a schematical, sectional side view of a thirteenth embodiment with three filter modules comprising each two partial fluid ducts.

The thirteenth embodiment of the device 1 shown in FIG. 13 differs from the afore described twelfth embodiment of the device 1 (FIG. 12) in that way that, instead of two filter modules, three filter modules 3, 3' and 3" are provided in the embodiment shows in FIG. 13. Hereby these filter modules 3, 3' and 3" are constructed as this is described above for the filter modules 3 and 3' of the embodiment shown in FIG. 12. The distribution module 2 of the embodiment shown in FIG. 13, however, differs from the afore described distribution module 2 in that in the case of the thirteenth embodiment (FIG. 13) the distribution module 2 comprises six distribution ducts 5a to 5f and the final module 4 comprises threat outlet ducts 7a to 7c, whereby the outlet duct 7b is a common outlet duct. Except that the construction of the construction of the thirteenth embodiment shown in FIG. 13 corresponds with the afore described twelfth embodiment (FIG. 12).

In the case of the afore described embodiments of the device 1 being shown in the FIGS. 1 to 13 the at least one filter 11 being located in the axial bolt 9 was only described in a general way, whereby no details are given in respect to the concrete construction of this bolt and of the at least one filter 11.

Figure 14:
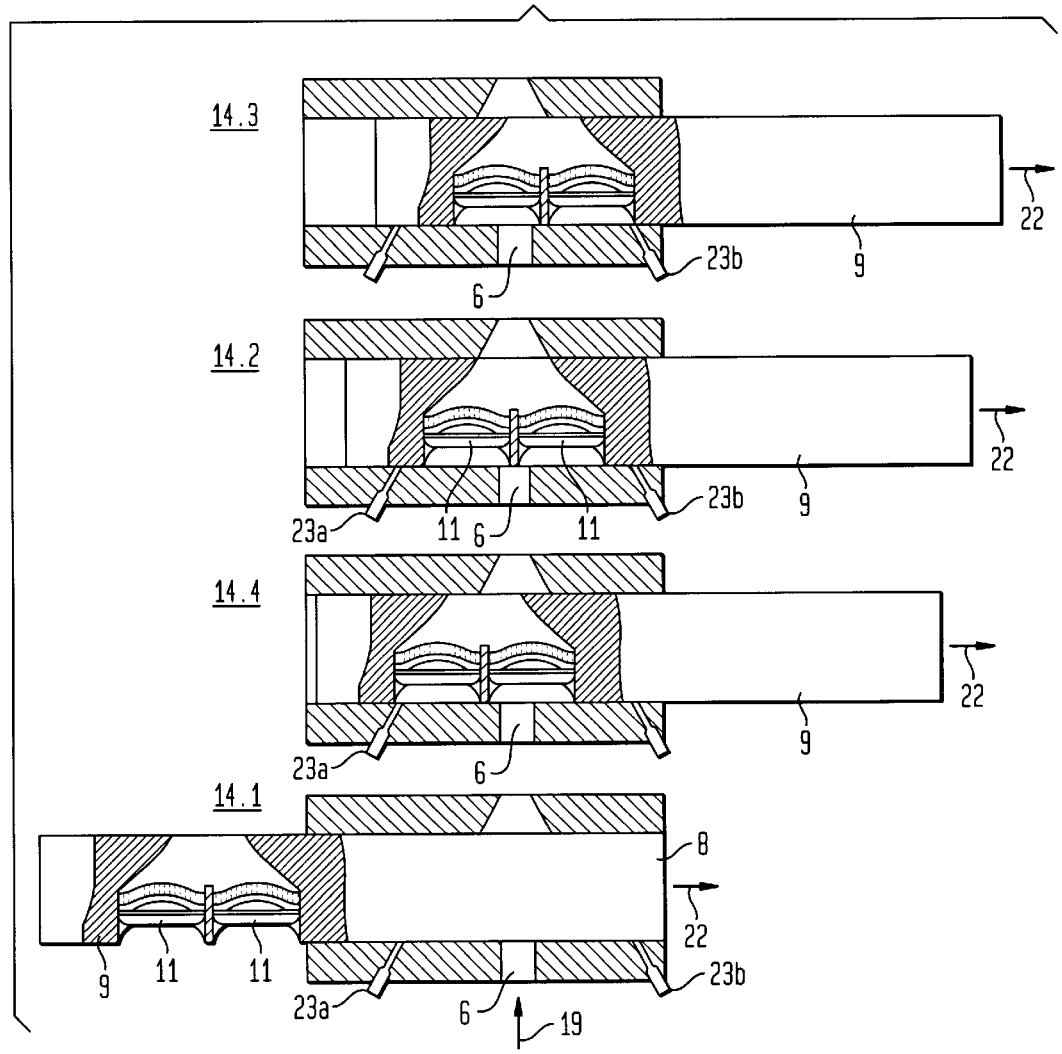
FIG. 14 a schematical view of the different operation positions of the bolt according to the sectional view A–B in FIG. 13.

The FIG. 14 shows an embodiment of the bolt 9 with filters 11 being located therein, whereby different operation positions of the axially shiftable bolt 9 are shown in FIG. 14.

Hereby the FIG. 14 comprising the FIGS. 14.1 to 14.1 corresponds with a sectional view along the line A-B in FIG. 1.

As already described above, the bolt 9 which supports two filters 11 in the embodiment shown in FIG. 14 can be axially shifted within a housing bore 8 in arrow direction 22 and oppositely to the arrow direction 22.

The bolt 9 is arranged vertically to the flow direction of the fluid within the partial fluid duct 6, whereby the flow direction of the fluid is marked with 19 (arrow direction).

An outlet element 23a, respectively 23b, extends on the left side and on the right side of the partial fluid duct 6 until reaching the bore 8 which supports the axial shifting of the bolt 9 in a fluid-tight manner, whereby, depending of the position of the bolt 9, the outlet element 23a, respectively 23b, is closed or optionally the outlet element 23a or the outlet element 23b is opened towards the atmosphere.

The FIG. 14.1 shows a position of the bolt 9 in which the two filters 11 being supported by means of the bolt 9 are located outside of the housing of the filter module, so that these two filters 11 are accessible from the outside and can be exchanged.

By axially shifting the bolt 9 in arrow direction 22 to the right the bolt 9 is positioned as this is shown in FIG. 14.2. In this position shown in FIG. 14.2 the two outlet elements 23a and 23b are closed by means of the bolt 9 itself, whereas both filters 11 are arranged normally with respect to the flow direction 19 of the fluid within the partial fluid duct. In this operation position being also named first position the fluid entered in arrow direction 19 by means of the partial fluid duct 6 is concurrently filtered by means of both filters 11, so that the filtered fluid is then removed downstream of the filters 11 by means of the area of the fluid removal duct being arranged downstream of the bolt 9.

If it is observed that, for example, the right filter (FIG. 14.2) is soiled, the bolt 9 is axially shifted into the position as it is shown in FIG. 14.3. In this position the filter entered in arrow direction 19 is now only filtered by means of the left filter 11, whereas the right filter is closed so that the fluid cannot enter.

Depending on the fact that in the position of the bolt 9 shown in FIG. 14.3 a back pressure is generated in the space provided downstream of the filters 11, a partial stream of the filtered fluid is led through right filter 11 oppositely to the arrow direction 19 as soon as the outlet element 23b is opened towards the atmosphere.

After successfully back-rinsing or regenerating the right filter 11 the soil particles deposited on the left filter 11 can be removed as far as this is necessary. For that purpose the bolt 9 is axially shifted oppositely to the arrow direction 22, whereby this position is then schematically shown in the FIG. 14.4. In this position the fluid is filtered by means of the right filter, whereby a partial stream of the filtered fluid flows oppositely to the arrow direction 19 through the left filter 11 as soon as the outlet element 23a is opened towards the atmosphere. After successfully back-rinsing, respectively regenerating, the left filter the bolt again axially shifted in arrow direction 22, so that it reaches a position in which both filters 11 filter, whereby this operation position is shown in FIG. 14.2.

The outlet elements 23a and 23b can optionally be formed as penetration ducts, so that the soiled partial fluid stream is removed as soon as the bolt is brought by an axial shifting in a position as it is shown in the FIGS. 14.3 or 14.4. It is, however, particularly suitable to provide each of these outlet elements 23a and 23b with a valve by which the removed amount of fluid can be adjusted.

It is furthermore possible to form the bolt in such a way that it only supports one filter. It is also possible to provide a multitude of filters as this principally described in the FIG. 1 of the DE 15 54 913.

The bolt 9 described above in connection with the FIG. 14 thus joins the blocking element with the outlet element in a single bolt and makes it possible to individually back-rinse each filter.

Figure 15:
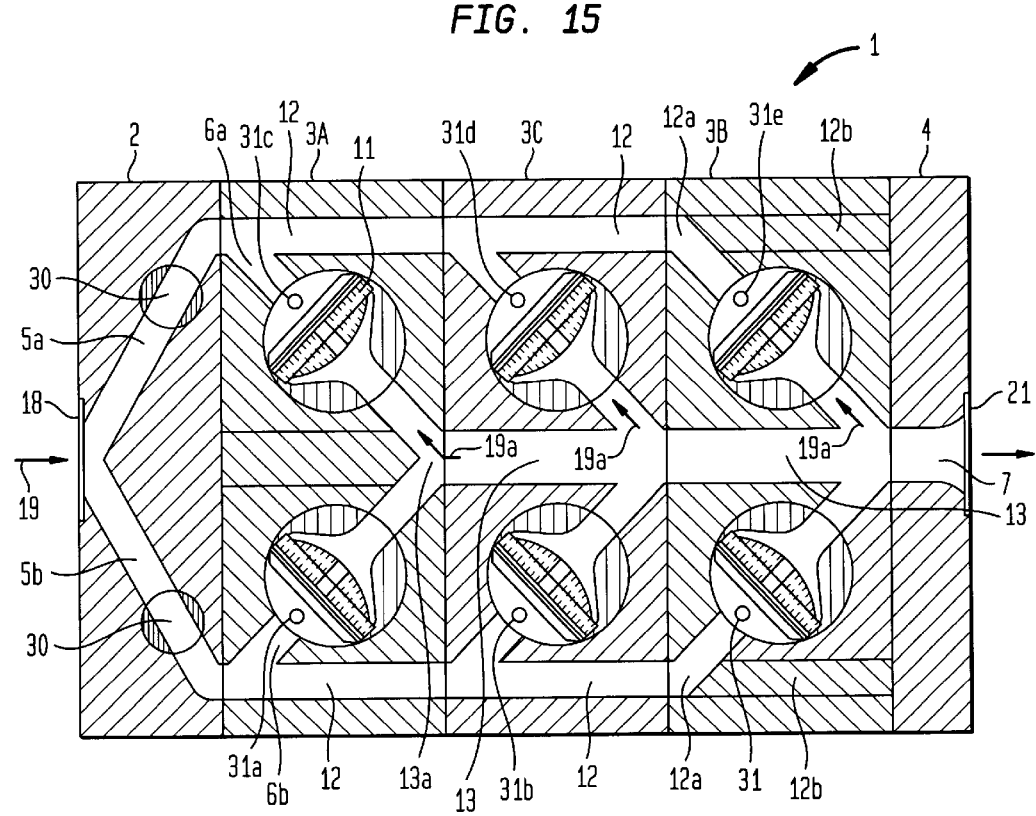
FIG. 15 a schematical, sectional view of a fourteenth embodiment with three filter modules comprising each two partial fluid ducts.

A further development of the device 1 is shown in FIG. 15, whereby the embodiment shown in FIG. 15 corresponds in respect to the arrangement of the distribution module 2, of the filter modules 3 and of the module 4 with the embodiment as it is described above in detail in connection with FIG. 11. For that reason it is renounced on repeating the corresponding explanations, so that instead of that it is to be referred to the corresponding explanations for FIG. 1.

The difference between the fourteenth embodiment shown in FIG. 15 and the eleventh embodiment shown in FIG. 11 is that a blocking element 30 is arranged in the distribution duct 5a and in the distribution duct 5b of the distribution module 2, whereby in the position shown in FIG. 15 these blocking elements 30 neither block the fluid flow in the distribution duct 5a nor in the distribution duct 5b.

By turning or particularly by axially shifting the blocking element 30 being formed as a bolt the fluid supply to the filter modules can optionally be blocked in the distribution duct 5a or in the distribution duct 5b, so that correspondingly to that the upper three first connection ducts 12 are not anymore supplied with fluid when the distribution duct 5a is blocked and the lower three first connection ducts 12 are not anymore supplied with fluid when the lower distribution duct 5b is blocked.

Each bolt comprises upstream of the filter 11 an outlet element 31, 31a, 31b, 31c, 31d and 31e, whereby the outlet element 31 to 31e can be brought into an opened position whereby a connection to the atmosphere is opened.

If in the case of the embodiment shown in FIG. 15 the upper row of the filters 11 are to be back-rinses, which is always desired when the corresponding filters contain soil particles, the blocking element 30 of the distribution duct 5a is brought from its opened Position into a closed positions At the same time the outlet elements 31c to 31e are opened, so that hereby the connection to the atmosphere is generated. Depending on the fact that the filtered fluid still leaves the outlet duct of the final module in arrow direction 19 by means of the lower row of filters and that hereby a back pressure is generated particularly in the case of viscous liquids as, for example, in the case of molten plastics, a partial stream of the filtered fluid flows in arrow direction 19 a through the partial fluid ducts 6 of the upper filters, so that this partial fluid stream removes the soil particles from the corresponding filters and is then led into the atmosphere by means of the opened outlet elements 31c to 31e. After cleaning the filters the outlet elements are closed and the blocking element 30 of the distribution duct 5a is opened, so that all filters are again available for the filtering.

The regeneration, respectively the back-rinsing, of the lower row of filters is analogously realized, whereby for this purpose the blocking element 30 of the distribution duct 5b is closed and the outlet elements 31 till 31b are opened.

The concrete forming of the blocking element 31 to 31e is shown and described in detail in the European Patent Application 0 672 443, particularly in the FIGS. 9 and 10.

Figure 16:
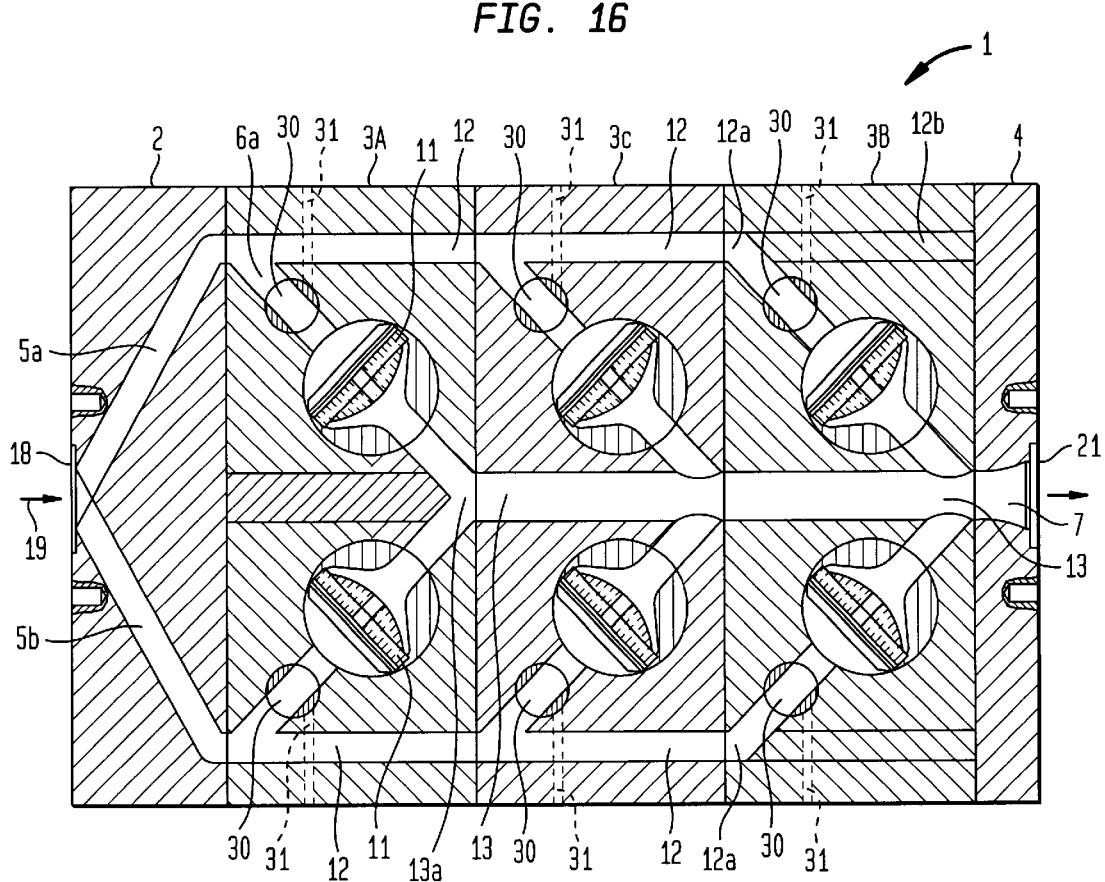
FIG. 16 a schematical, sectional side view of a fifteenth embodiment with three filter modules comprising each two partial fluid ducts.

The FIG. 16 shows a further development of the device 1, whereby, in respect to the modular constructions this development of the FIG. 16 does not differ from the afore described embodiment and from the embodiment according to FIG. 11.

In difference to the afore described embodiment the embodiment shown in FIG. 16, however, is modified in such a way that each partial fluid duct 6a comprises upstream of the filter a separate blocking element 30, whereby this blocking element 30 is integrated with an outlet element 31 which can be opened to the atmosphere.

In the case of the embodiment shown in FIG. 16 one filter up to five filters can be regenerated, respectively back-rinsed, by bringing the blocking element of these filters into a closed position, which causes an interruption of the supply of filtered fluid to the filter, respectively to the filter. Depending on that fact that at least one filter is not closed for the fluid supply of the fluid to be filtered, a corresponding back pressure is generated which causes that the filtered fluid perfuses oppositely to the filtering direction the correspondingly closed partial fluid duct, respectively the correspondingly closed partial fluid ducts, and thus back-rinses the filter, respectively the filters, being arranged therein, so that correspondingly to that the fluid containing soil particles is then led into the atmosphere by means of the individual outlet element. This way single filters can specifically be back-rinsed without making it necessary to interrupt the supply of filtered fluid to the partial fluid duct.

The embodiments described above in connection with the FIGS. 24 and 15 also allow such a continuous back-rinsing by which a partial stream of the filtered fluid is thus provided for the back-rinsing of the corresponding filter and by which the remaining partial stream is provided for the supply of the fluid removal duct. This is particularly advantageous because hereby an interruption of the production does not occur.

A particularly compact construction allows a modification of the afore described embodiments in which the final module comprises only one single outlet duct. In this case it is even possible to renounce on the final module, whereby the common second connection duct 13 then comprises at its end side the connection area 21 or is directly connected with the fluid removal duct.

In the case of all embodiments described above in connection with the drawings the partial fluid duct 6 is arranged in an angle α of 45° relatively to the sealing surface, whereas the first and the second connection ducts are arranged parallels to each other and vertically to the sealing surface.

What is claimed is:

1. A device for the filtering of a fluid stream having a modular construction, comprising:
    a distribution module having at least one distribution duct, at least a first filter module, and a final module having at least one outlet duct, wherein the distribution module, the first filter module, and the final module are detachably connected to each other,
    wherein the first filter module is a unitary block comprising:
        first and second opposed faces parallel to each other,
        a bore extending through the block, the bore having a central axis which is parallel to the planes of the first and second faces,
        an axially shiftable bolt in the bore for receiving at least one filter,
        a partial fluid duct which includes the bore and extends from the first face of the block to an outlet of the partial fluid duct located downstream of the filter,
        wherein the bore is arranged so that an upstream face of the filter extends normally with respect to a longitudinal axis of the partial fluid duct,
        a first connection duct extending from the first face to the second face of the block, and
        a second connection duct extending from the outlet of the partial fluid duct to the outlet duct of the final module,
    wherein the fluid stream to be filtered flows at least through the distribution duct, the partial fluid duct and, after filtering, into the second connection duct and then into the outlet duct, and
    wherein the first connection duct of the first filter module is connected to the final module in a fluid-tight manner.

2. The device of claim 1 wherein the distribution module and the final module each include a sealing surface for fluid-tight connection to the first filter module.

3. The device of claim 1, further comprising at least a second filter module construction as the first filter module detachably connected to each other by the first, and second opposed faces arranged as first and second sealing surfaces arranged to said first and second filter modules opposite to each other, and wherein the first filter module is detachably connected in a fluid-tight manner to the sealing surface of the distribution module by the first sealing surface of the first-filter module, and wherein the second filter module is detachably connected in a fluid-tight manner to the sealing surface of the final module by the second sealing surface of the second filter module.

4. The device of claim 3, wherein the partial fluid duct is inclined at an angle between 30° and 65° relative to the first and second sealing surfaces.

5. The device of claim 1, for filtering a molten plastic.

6. The device of claim 1 wherein the distribution module includes a first connection area for connection to an existing fluid supply duct, and wherein the final module includes a second connection area for connection to an existing fluid removal duct.

7. The device of claim 1 further comprising at least a second filter module that includes first and second opposed faces parallel to each other, wherein the second face of the first module is fluidly connected to the first face of the second filter module, wherein the distribution module is fluidly connected to the first face of the first filter module, and wherein the second face of the second module is fluidly connected to the final module, wherein the second filter module further includes at least one partial fluid duct having at least filter supported by the axially shiftable bolt, a first connection duct for supplying non-filtered fluid, and a second connection duct for removing the filtered fluid.

8. The device of claim 7 wherein the first and second connection ducts are arranged normally with respect to the first and second sealing surfaces.

9. The device of claim 7 wherein the first filter module includes two partial fluid ducts.

10. The device of claim 9 wherein the partial fluid ducts are inclined at an angle between 30° and 65° relative to the first and second connection ducts.

11. The device of claim 10 wherein the first filter module further includes two first connection ducts and one second connection duct.

* * * * *